(12) United States Patent
Karras et al.

(10) Patent No.: US 10,025,879 B2
(45) Date of Patent: Jul. 17, 2018

(54) TREE DATA STRUCTURES BASED ON A PLURALITY OF LOCAL COORDINATE SYSTEMS

(71) Applicant: NVIDIA Corporation, Santa Clara, CA (US)

(72) Inventors: Tero Tapani Karras, Helsinki (FI); Samuli Matias Laine, Vantaa (FI); Timo Oskari Aila, Tuusula (FI)

(73) Assignee: NVIDIA Corporation, Santa Clara, CA (US)

( * ) Notice: Subject to any disclaimer, the term of this patent is extended or adjusted under 35 U.S.C. 154(b) by 515 days.

(21) Appl. No.: 14/697,480

(22) Filed: Apr. 27, 2015

(65) Prior Publication Data

US 2016/0070767 A1 Mar. 10, 2016

Related U.S. Application Data

(60) Provisional application No. 62/046,093, filed on Sep. 4, 2014.

(51) Int. Cl.
*G06T 3/00* (2006.01)
*H04N 19/18* (2014.01)
(Continued)

(52) U.S. Cl.
CPC .. *G06F 17/30961* (2013.01); *G06F 17/30327* (2013.01); *G06F 17/30563* (2013.01);
(Continued)

(58) Field of Classification Search
CPC ......... G06F 17/30256; G06F 17/30442; G06F 17/30466; G06F 17/30566; G06F 17/3071; G06F 17/30327; G06F 17/30448; G06F 17/30563; G06F 17/30961; G06T 3/00; H04N 19/18; H04N 19/182; H04N 19/60
(Continued)

(56) References Cited

U.S. PATENT DOCUMENTS 6,184,897 B1  2/2001  Gueziec et al.
6,326,963 B1  12/2001  Meehan
(Continued)

OTHER PUBLICATIONS

Non-Final Office Action from U.S. Appl. No. 15/377,959, dated Jun. 15, 2017.
(Continued)

*Primary Examiner* — Hanh B Thai
(74) *Attorney, Agent, or Firm* — Zilka-Kotab, PC

(57) ABSTRACT

A system, computer readable medium, and method are disclosed for performing a tree traversal operation. The method includes the steps of executing, via a processor, a tree traversal operation for a tree data structure, receiving a transformation node that includes transformation data during the tree traversal operation, and transforming spatial data included in a query data structure based on the transformation data. Each node in the tree data structure is classified according to one of a plurality of nodesets, the plurality of nodesets corresponding to a plurality of local coordinate systems. The processor may be a parallel processing unit that includes one or more tree traversal units, which implement the tree traversal operation in hardware, software, or a combination of hardware and software.

20 Claims, 14 Drawing Sheets

(51) Int. Cl.

| | |
|---|---|
| H04N 19/182 | (2014.01) |
| G06F 17/30 | (2006.01) |
| G06T 15/00 | (2011.01) |
| G06T 15/06 | (2011.01) |
| G06T 15/80 | (2011.01) |
| G06T 15/08 | (2011.01) |
| G06T 15/10 | (2011.01) |
| H04N 19/174 | (2014.01) |
| H04N 19/44 | (2014.01) |
| G06T 1/60 | (2006.01) |
| G06T 17/10 | (2006.01) |
| G06T 9/40 | (2006.01) |

(52) U.S. Cl.
CPC .......... *G06T 1/60* (2013.01); *G06T 9/40* (2013.01); *G06T 15/005* (2013.01); *G06T 15/06* (2013.01); *G06T 15/08* (2013.01); *G06T 15/10* (2013.01); *G06T 15/80* (2013.01); *G06T 17/10* (2013.01); *H04N 19/174* (2014.11); *H04N 19/44* (2014.11)

(58) Field of Classification Search
USPC .......................................................... 707/602
See application file for complete search history.

(56) References Cited

U.S. PATENT DOCUMENTS

| | | | |
|---|---|---|---|
| 6,373,488 | B1 | 4/2002 | Gasper et al. |
| 7,064,766 | B2* | 6/2006 | Beda .................. G06T 15/00 345/557 |
| 7,145,562 | B2 | 12/2006 | Schechter et al. |
| 7,161,599 | B2* | 1/2007 | Beda .................. G06T 13/00 345/419 |
| 7,337,163 | B1* | 2/2008 | Srinivasan ........ G06F 17/30442 |
| 7,477,259 | B2* | 1/2009 | Beda .................. G06T 15/00 345/557 |
| 7,495,664 | B2* | 2/2009 | Keller ................ G06T 15/06 345/426 |
| 7,619,633 | B2* | 11/2009 | Beda .................. G06T 15/005 345/473 |
| 7,705,851 | B2* | 4/2010 | Beda .................. G06T 13/00 345/501 |
| 7,792,817 | B2* | 9/2010 | Shan ................ G06F 17/30566 707/705 |
| 7,808,506 | B2* | 10/2010 | Beda .................. G06T 15/005 345/419 |
| 7,930,311 | B2* | 4/2011 | Feng .................. G06F 17/3071 707/758 |
| 8,217,935 | B2 | 7/2012 | Purcell et al. |
| 8,452,088 | B1* | 5/2013 | De Ponti .......... G06F 17/30256 382/165 |
| 8,502,819 | B1 | 8/2013 | Aila et al. |
| 8,791,945 | B2 | 7/2014 | Clarberg et al. |
| 9,146,957 | B2* | 9/2015 | Wong ................ G06F 17/30466 |
| 9,552,664 | B2 | 1/2017 | Laine et al. |
| 9,582,607 | B2 | 2/2017 | Laine et al. |
| 2003/0076328 | A1* | 4/2003 | Beda .................. G06T 13/00 345/503 |
| 2003/0076329 | A1* | 4/2003 | Beda .................. G06T 15/00 345/557 |
| 2004/0130550 | A1* | 7/2004 | Blanco ............... G06T 13/00 345/473 |
| 2006/0244754 | A1* | 11/2006 | Beda .................. G06T 15/005 345/557 |
| 2007/0024615 | A1 | 2/2007 | Keller et al. |
| 2007/0182732 | A1 | 8/2007 | Woop et al. |
| 2008/0040384 | A1 | 2/2008 | Kuznetsov |
| 2008/0259075 | A1* | 10/2008 | Fowler ............... G06T 15/06 345/421 |
| 2009/0256845 | A1 | 10/2009 | Sevastianov et al. |
| 2010/0192215 | A1* | 7/2010 | Yaxuan .................. H04L 47/10 726/11 |
| 2010/0238169 | A1 | 9/2010 | Fowler et al. |
| 2011/0080403 | A1* | 4/2011 | Ernst .................. G06T 15/06 345/420 |
| 2012/0050289 | A1 | 3/2012 | Park et al. |
| 2012/0268483 | A1 | 10/2012 | Soupikov et al. |
| 2013/0016109 | A1 | 1/2013 | Garanzha |
| 2014/0192904 | A1* | 7/2014 | Rosewarne .......... H04N 19/86 375/240.29 |
| 2015/0109301 | A1 | 4/2015 | Lee et al. |
| 2015/0138202 | A1 | 5/2015 | Lee et al. |
| 2016/0070767 | A1 | 3/2016 | Karras et al. |
| 2016/0070820 | A1 | 3/2016 | Laine et al. |
| 2016/0071312 | A1 | 3/2016 | Laine et al. |
| 2016/0071313 | A1 | 3/2016 | Laine et al. |
| 2017/0116760 | A1 | 4/2017 | Laine et al. |
| 2017/0178387 | A1 | 6/2017 | Woop et al. |

OTHER PUBLICATIONS

Mahovsky et al., "Memory-Conserving Bounding Volume Hierarchies with Coherent Raytracing," Computer Graphics Forum, vol. 25, No. 2, Blackwell Publishing Ltd, 2006, pp. 1-8.
Non-Final Office Action from U.S. Appl. No. 14/589,904, dated Apr. 7, 2016.
Non-Final Office Action from U.S. Appl. No. 14/589,910, dated Feb. 18, 2016.
Mahovsky, J., Ray Tracing with Reduced-Precision Bounding Volume Hierarchies. PhD thesis, University of Calgary, 2005, pp. i-vii, 1-4, 66-70, 84-87, 145-148.
Yoon, S.-E., and Manocha, D., "Cache-efficient layouts of bounding volume hierarchies," Computer Graphics Forum (Eurographics) 25, 2006, pp. 507-516.
Kim, Tae-Joon, et al., "RACBVHs: Random-accessible compressed bounding volume hierarchies," Visualization and Computer Graphics, 2010, pp. 1-8.
MacDonald, J. D. et al., "Heuristics for ray tracing using space subdivision," The Visual Computer, vol. 6, 1990, pp. 153-166.
Goldsmith, J. et al., "Automatic Creation of Object Hierarchies for Ray Tracing," IEEE CG&A, May 1987, pp. 14-20.
Notice of Allowance from U.S. Appl. No. 14/589,910, dated Sep. 13, 2016.
Notice of Allowance from U.S. Appl. No. 14/589,904, dated Oct. 17, 2016.
Barringer, R. et al., "Dynamic Stackless Binary Tree Traversal," Journal of Computer Graphics Techniques, vol. 2, No. 1, 2013, pp. 38-49.
Foley, T. et al., "KD-Tree Acceleration Structures for a GPU Raytracer," Graphics Hardware, The Eurographics Association, 2005, pp. 1-8.
Horn et al., "Interactive k-D Tree GPU Raytracing," ACM, Proceedings of the 2007 Symposium on Interactive 3D Graphics and Games, 2007, pp. 1-8.
Kalojanov, J. et al., "Two-Level Grids for Ray Tracing on GPUs," EUROGRAPHICS, vol. 30, No. 2, 2011, pp. 1-8.
Laine, S., "Restart Trail for Stackless BVH Traversal," High Performance Graphics, The Eurographics Association, 2010, pp. 1-5.
Makinen, E., "A Survey on Binary Tree Codings," The Computer Journal, vol. 34, No. 5, 1991, pp. 438-443.
Parker, S. G. et al., "OptiX: A General Purpose Ray Tracing Engine," ACM Transactions on Graphics, 2010, pp. 1-13.
Wachter, C. et al., "Instant Ray Tracing: The Bounding Interval Hierarchy," Eurographics Symposium on Rendering, The Eurographics Association, 2006, pp. 1-11.
Non-Final Office Action from U.S. Appl. No. 14/563,872, dated Oct. 11, 2017.
Notice of Allowance from U.S. Appl. No. 15/377,959, dated Oct. 23, 2017.
Final Office Action from U.S. Appl. No. 14/563,872, dated May 11, 2018.

* cited by examiner

TREE DATA STRUCTURES BASED ON A PLURALITY OF LOCAL COORDINATE SYSTEMS

CLAIM OF PRIORITY

This application claims the benefit of U.S. Provisional Application No. 62/046,093 titled "Bounding Volume Hierarchy Representation and Traversal," filed Sep. 4, 2014, the entire contents of which is incorporated herein by reference.

FIELD OF THE INVENTION

The present invention relates to data structure representations, and more particularly to the improvement of spatial resolution of tree data structures using local coordinate systems.

BACKGROUND

Computer graphics uses a variety of methods to generate two-dimensional representations of a three-dimensional scene. For example, a three-dimensional scene represented as a plurality of geometric primitives (e.g., points, lines, triangles, quads, meshes, etc.) may be rasterized to intersect the geometric primitives with a projection plane and then shaded to calculate a color for one or more pixels of the projection plane based on the rasterization. Alternatively, another technique for generating two-dimensional representations of the three-dimensional scenes is to perform ray-tracing. As is known in the art, ray-tracing is a technique that includes the operation of sending out rays from a particular viewpoint and intersecting the rays with the geometry of the scene. When an intersection is detected, lighting and shading operations may be performed to generate a color value for a pixel of the projection plane intersected by the ray. Additionally, other rays may be generated based on the intersected primitives that contribute to the color of the intersected pixel or other pixels.

Because the number of geometric primitives in a scene may be quite large (e.g., on the order of millions of triangles, etc.) and the number of rays generated to test for intersection against those primitives is also large (e.g., on the order of millions or even billions of rays, etc.), a data structure may be generated to increase the efficiency of performing the intersection tests. The data structure may be referred to as a spatial acceleration structure because the topology of the structure enables efficient searching of a three-dimensional space. One such data structure is a tree, such as a k-d (k-dimensional) tree, an R*-tree, or a bounding volume hierarchy. When an intersection test is performed for a given ray, a tree traversal may be performed in order to efficiently test the ray against all of the primitives included in the scene.

Conventional trees may define each of the nodes in the tree relative to a global coordinate system. The global coordinate system is used to locate points in a three-dimensional space, and may be associated with an origin O. Each point in the three-dimensional space may then be defined using a set of coordinates, such as an x-coordinate that specifies a location of the point relative to the x-axis, a y-coordinate that specifies a location of the point relative to the y-axis, and a z-coordinate that specifies a location of the point relative to the z-axis. When nodes of the tree are encoded in a data structure, attributes of the nodes, such as a bounding volume associated with the node, may be encoded using geometry specified relative to the global coordinate system. For example, an axis-aligned bounding box for a node may be specified by encoding six values that represent the locations of the six planes of the axis-aligned bounding box relative to the global coordinate system (e.g., a minimum and maximum plane located on the x-axis, a minimum and maximum plane located on the y-axis, and a minimum and maximum plane located on the z-axis). Conventionally, each value is encoded using a fixed-width encoding technique. For example, each value may be specified as a 32-bit floating point value.

One shortcoming of traditional acceleration structures is that the spatial resolution of data encoded within the structure is limited by a precision of the fixed-width encoding technique. When the extents of the scene become large, such limitations may make it difficult to effectively represent fine details. Effectively, all of the bits of the fixed-width encoding are used to represent coarse details of the scene, while none of the bits are used to represent fine details of the scene. For example, individual blades of grass may be difficult to differentiate using values encoded with the fixed-width encoding technique if the extents of the scene are many orders of magnitude larger than the extents of a blade of grass (e.g., the scene models a city, etc.). Thus, there is a need for addressing these issues and/or other issues associated with the prior art.

SUMMARY

A system, computer readable medium, and method are disclosed for performing a tree traversal operation. The method includes the steps of executing, via a processor, a tree traversal operation for a tree data structure, receiving a transformation node that includes transformation data during the tree traversal operation, and transforming spatial data included in a query data structure based on the transformation data. Each node in the tree data structure is classified into one of a plurality of nodesets, the plurality of nodesets corresponding to a plurality of local coordinate systems. The processor may be a parallel processing unit that includes one or more tree traversal units, which implement the tree traversal operation in hardware, software, or a combination of hardware and software.

DETAILED DESCRIPTION

Figure 1:
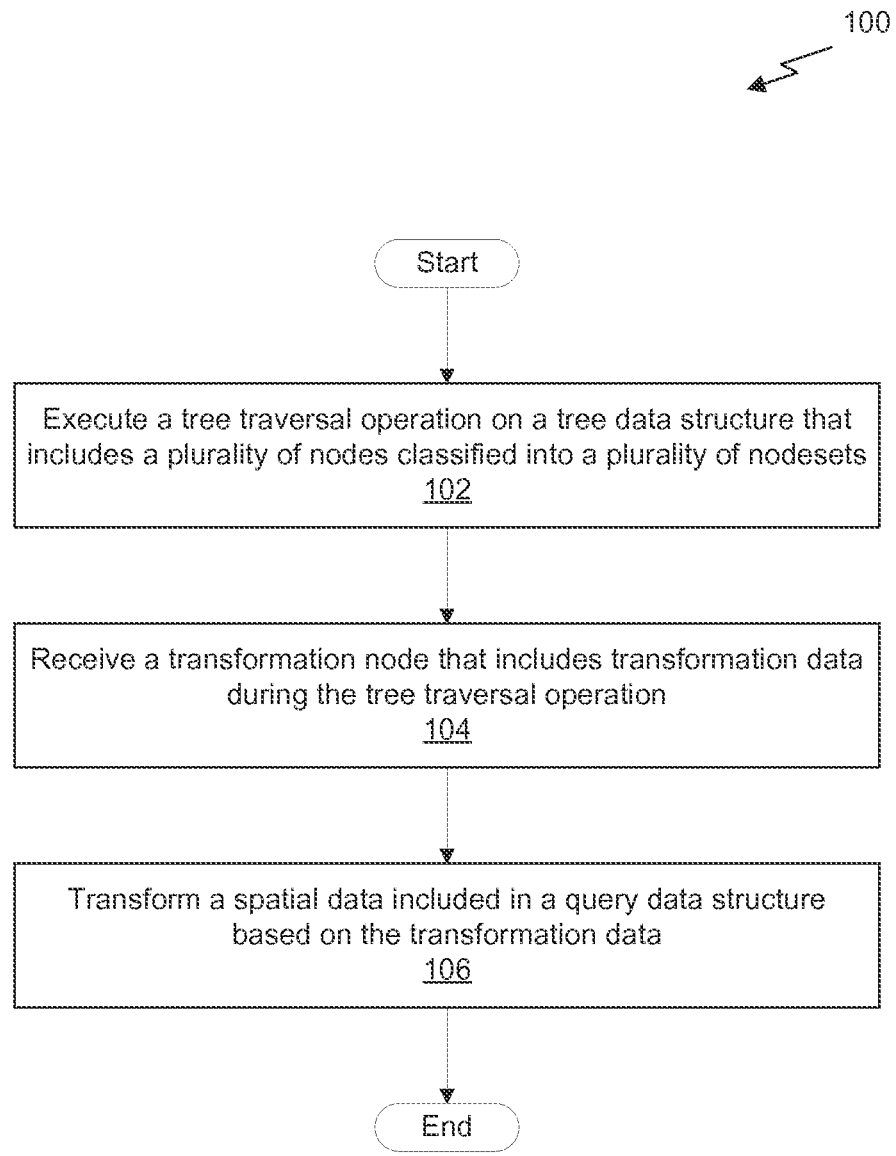
FIG. 1 illustrates a flowchart of a method for performing a tree traversal operation, in accordance with one embodiment.

FIG. 1 illustrates a flowchart of a method 100 for performing a tree traversal operation, in accordance with one embodiment. At step 102, a processor executes a tree traversal operation for a tree data structure. The tree traversal operation may be executed by a processor. In one embodiment, the processor is a parallel processing unit that includes one or more tree traversal units dedicated to executing tree traversal operations such as querying the tree data structure to find a plurality of elements based on a query shape represented by a query data structure. The tree traversal operation may be implemented in hardware (e.g., by a static integrated circuit, etc.), software (e.g., one or more instructions implemented by a programmable core or cores, etc.), or a combination of hardware and software. For example, the tree traversal unit may implement various logic that is configured to execute a loop for processing nodes during execution of the tree traversal operation, or the tree traversal unit may include one or more special processing units configured to execute an instruction set, where a plurality of instructions may be executed by the tree traversal unit to implement the tree traversal operation. In some embodiments, multiple tree traversal operations may be in flight simultaneously. In other words, a tree traversal unit may be configured to process multiple tree traversal operations, associated with the same or different tree data structures, in parallel.

Tree data structures may be traversed according to various algorithms. One algorithm may perform a tree traversal operation according to a depth-first traversal method. Another algorithm may perform a tree traversal operation according to a breadth-first traversal method. As each node in the tree data structure is traversed, one or more child nodes of the node may be tested for intersection with a query data structure, such as a ray. Each of the intersected child nodes may need to be traversed with respect to additional paths in the tree data structure that descend from those child nodes.

There are many techniques for managing the tree traversal operation. One technique is to use a stack data structure to temporarily store any nodes of the tree data structure encountered during the traversal that represent alternate paths to take while traversing the tree. When a particular node is processed by the traversal algorithm, each of the child nodes of the node are tested for intersection with the query data structure. Then, each of the intersected child nodes (i.e., those child nodes that intersect the query data structure) are added to the stack data structure. Then, as long as the stack data structure includes at least one element, the top element of the stack data structure is popped from the stack data structure and the process of testing the child nodes of the popped node for intersection with the query data structure is repeated.

The tree traversal operation may be configured to intersect a query data structure with the tree data structure to select one or more elements associated with the tree data structure for further processing. For example, a ray data structure that specifies a ray may be intersected with a bounding volume hierarchy to select one or more geometric primitives associated with the bounding volume hierarchy for further processing.

In one embodiment, a query data structure may represent a geometric shape to intersect with the nodes of the tree data structure, such as an axis-aligned bounding box (AABB), a frustum, or a ray. The tree data structure may be traversed in a depth-first manner starting at the root node of the tree data structure. Paths may be defined as the order of processing from one node to the next node of the tree data structure. As each path is traversed, nodes of the tree data structure are intersected by the query data structure. Multiple intersected child nodes may require the tree traversal operation to be bifurcated. In other words, when more than one child node is intersected by the query data structure, the path may diverge. One technique for handling this divergence in processing is to utilize a stack data structure. As one path in the tree is taken from a particular node, other paths that are not taken may be stored in the stack data structure, such as by storing a node (or a pointer to a node) in the stack data structure that represents the divergent path not immediately selected for processing. For example, when a particular node is processed in the tree traversal operation, two or more child nodes of the node may be tested for intersection with the query data structure. When the intersection test indicates that two or more child nodes are intersected by the query data structure, then traversal of the tree data structure must take two divergent paths. While the processing of the tree data structure is continued for one of the intersected child nodes, the other intersected child node(s) may be stored in the stack data structure to be tested once the traversal of all of the nodes associated with the first intersected child node has been completed.

The tree data structure associated with the tree traversal operation may include a plurality of nodes. Each of the nodes in the tree data structure may be classified into one of a plurality of nodesets. A nodeset, as referred to herein, is a collection of related nodes. In one embodiment, each of the nodes in a particular nodeset is related as having spatial data that is specified relative to a corresponding local coordinate system. In other words, the coordinate values, whether single coordinate values associated with a single axis of the local coordinate system or multiple coordinate values that make up a vector for specifying a point relative to the origin of the local coordinate system, encoded for the nodes in a particular nodeset are specified relative to a particular local coordinate system such that different nodes belonging to different nodesets may be associated with encoded values that are specified relative to different coordinate systems. The multiple, different local coordinate systems enable a higher level of spatial resolution to be realized when performing the tree traversal operations than is possible using a single global coordinate system applied to the encoded values for all nodes in the tree data structure, given a fixed-width encoding scheme.

At step 104, the processor receives a transformation node during the tree traversal operation. The transformation node may be read from a memory and decoded by the processor. In one embodiment, the transformation node may include an identifier, such as a special combination encoded into a particular bit field of the transformation node, which identifies the transformation node as a transformation node. The transformation node may also include transformation data, such as encoded values that represent a special transformation matrix, that enable the processor to transform values specified relative to a first coordinate system into transformed values specified relative to a second coordinate system.

At step 106, the processor transforms spatial data included in a query data structure based on the transformation data. In one embodiment, the transformation data comprises the values of a transformation matrix that, when applied to the spatial data of a query data structure, such as a ray or axis-aligned bounding box, transforms the spatial data such that the spatial data is specified relative to a new local coordinate system associated with a particular nodeset. Spatial data encoded within each of the nodes of the nodeset may also be encoded relative to the new local coordinate system such that calculations between the spatial data of the query data structure and the spatial data of the nodes are performed consistently based on the same coordinate system.

It will be appreciated that the transformation nodes in the tree data structure demarcate edges located between two different nodesets. In other words, the transformation nodes indicate a transition from one local coordinate system to another local coordinate system within the tree data structure.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
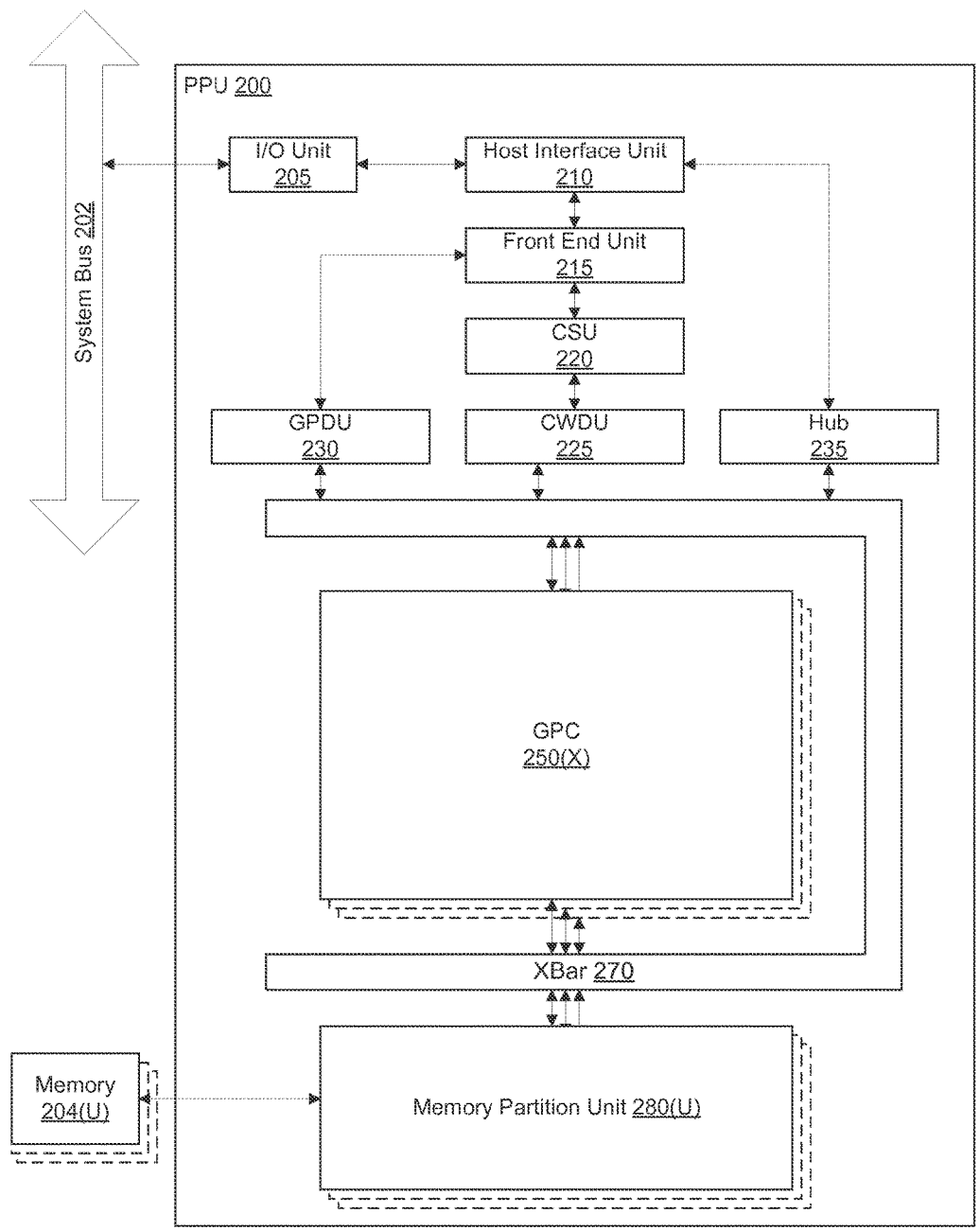
FIG. 2 illustrates a parallel processing unit, in accordance with one embodiment.

FIG. 2 illustrates a parallel processing unit (PPU) 200, in accordance with one embodiment. In one embodiment, the PPU 200 is a multi-threaded processor that is implemented on one or more integrated circuit devices. The PPU 200 is a latency hiding architecture designed to process a large number of threads in parallel. A thread (i.e., a thread of execution) is an instantiation of a set of instructions configured to be executed by the PPU 200. In one embodiment, the PPU 200 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 200 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

As shown in FIG. 2, the PPU 200 includes an Input/Output (I/O) unit 205, a host interface unit 210, a front end unit 215, a compute scheduler unit (CSU) 220, a compute work distribution unit (CWDU) 225, a graphics primitive distribution unit (GPDU) 230, a hub 235, a crossbar (Xbar) 270, one or more general processing clusters (GPCs) 250, and one or more memory partition units 280. The PPU 200 may be connected to a host processor or other peripheral devices via a system bus 202. The PPU 200 may also be connected to a local memory comprising a number of memory devices 204. In one embodiment, the local memory may comprise a number of dynamic random access memory (DRAM) devices.

The I/O unit 205 is configured to transmit and receive communications (i.e., commands, data, etc.) from a host processor (not shown) over the system bus 202. The I/O unit 205 may communicate with the host processor directly via the system bus 202 or through one or more intermediate devices such as a memory bridge. In one embodiment, the I/O unit 205 implements a Peripheral Component Interconnect Express (PCIe) interface for communications over a PCIce bus. In alternative embodiments, the I/O unit 205 may implement other types of well-known interfaces for communicating with external devices.

The I/O unit 205 is coupled to a host interface unit 210 that decodes packets received via the system bus 202. In one embodiment, the packets represent commands configured to cause the PPU 200 to perform various operations. The host interface unit 210 transmits the decoded commands to various other units of the PPU 200 as the commands may specify. For example, some commands may be transmitted to the front end unit 215. Other commands may be transmitted to the hub 235 or other units of the PPU 200 such as one or more copy engines, a video encoder, a video decoder, a power management unit, etc. (not explicitly shown). In other words, the host interface unit 210 is configured to route communications between and among the various logical units of the PPU 200.

In one embodiment, a program executed by the host processor encodes a command stream in a buffer that provides workloads to the PPU 200 for processing. A workload may comprise a number of instructions and pointers to data to be processed by those instructions. The buffer is a region in a memory that is accessible (i.e., read/write) by both the host processor and the PPU 200. For example, the host interface unit 210 may be configured to access the buffer in a system memory connected to the system bus 202 via memory requests transmitted over the system bus 202 by the I/O unit 205. In one embodiment, the host processor writes the command stream to the buffer and then transmits a pointer to the start of the command stream to the PPU 200. The host interface unit 210 manages the scheduling of instructions from one or more command streams written by the host processor (i.e., channels) on the various sub-units of the PPU 200.

The front end unit 215 receives instructions from the host interface unit 210 from one or more command streams and forwards those instructions to the correct sub-unit of the PPU 200. Instructions associated with a compute pipeline may be received by the front end unit 215. These compute instructions are then forwarded to a compute scheduler unit 220. The compute scheduler unit 220 is configured to track state information related to the various tasks managed by the compute scheduler unit 220. The state may indicate which GPC 250 a task is assigned to, whether the task is active or inactive, a priority level associated with the task, and so forth. The compute scheduler unit 220 manages the execution of a plurality of tasks on the one or more GPCs 250.

The compute scheduler unit 220 is coupled to a compute work distribution unit 225 that is configured to dispatch tasks for execution on the GPCs 250. The compute work distribution unit 225 may track a number of scheduled tasks received from the compute scheduler unit 220. In one embodiment, the compute work distribution unit 225 manages a pending task pool and an active task pool for each of the GPCs 250. The pending task pool may comprise a number of slots (e.g., 16 slots) that contain tasks assigned to be processed by a particular GPC 250. The active task pool may comprise a number of slots (e.g., 4 slots) for tasks that are actively being processed by the GPCs 250. As a GPC 250 finishes the execution of a task, that task is evicted from the active task pool for the GPC 250 and one of the other tasks from the pending task pool is selected and scheduled for execution on the GPC 250. If an active task has been idle on the GPC 250, such as while waiting for a data dependency to be resolved, then the active task may be evicted from the GPC 250 and returned to the pending task pool while another task in the pending task pool is selected and scheduled for execution on the GPC 250.

Returning to the front end unit 215, instructions associated with a graphics pipeline may be received by the front end unit 215. These graphics instructions are then forwarded to a graphics primitive distribution unit 230. The graphics primitive distribution unit 230 fetches vertex data from the memory 204 or the system memory via the system bus 202 for various graphics primitives. Graphics primitives may include points, lines, triangles, quads, triangle strips, and the like. The graphics primitive distribution unit 230 groups the vertices into batches of primitives and dispatches tasks to the GPCs 250 for processing the batches of primitives. Processing may involve executing a shader (i.e., a Vertex Shader, Tesselation Shader, Geometry Shader, etc.) on a programmable processing unit as well as performing fixed function operations on the vertices such as clipping, culling, and viewport transformation using a fixed function unit.

The compute work distribution unit 225 and the graphics primitive distribution unit 230 communicate with the one or more GPCs 250 via a XBar 270. The XBar 270 is an interconnect network that couples many of the units of the PPU 200 to other units of the PPU 200. For example, the XBar 270 may be configured to couple the compute work distribution unit 225 to a particular GPC 250. Although not shown explicitly, one or more other units of the PPU 200 are coupled to the host unit 210. The other units may also be connected to the XBar 270 via a hub 235.

The tasks associated with the compute pipeline are managed by the compute scheduler unit 220 and dispatched to a GPC 250 by the compute work distribution unit 225. The tasks associated with the graphics pipeline are managed and distributed to a GPC 250 by the graphics primitive distribution unit 230. The GPC 250 is configured to process the tasks and generate results. The results may be consumed by other tasks within the GPC 250, routed to a different GPC 250 via the XBar 270, or stored in the memory 204. The results can be written to the memory 204 via the memory partition units 280, which implement a memory interface for reading and writing data to/from the memory 204. In one embodiment, the PPU 200 includes a number U of memory partition units 280 that is equal to the number of separate and distinct memory devices 204 coupled to the PPU 200. A memory partition unit 280 will be described in more detail below in conjunction with FIG. 3B.

In one embodiment, a host processor executes a driver kernel that implements an application programming interface (API) that enables one or more applications executing on the host processor to schedule operations for execution on the PPU 200. An application may generate instructions (i.e., API calls) that cause the driver kernel to generate one or more tasks for execution by the PPU 200. The driver kernel outputs tasks to one or more streams being processed by the PPU 200. Each task may comprise one or more groups of related threads, referred to herein as a warp. A thread block may refer to a plurality of groups of threads including instructions to perform the task. Threads in the same thread block may exchange data through shared memory. In one embodiment, a warp comprises 32 related threads.

Figure 3A:
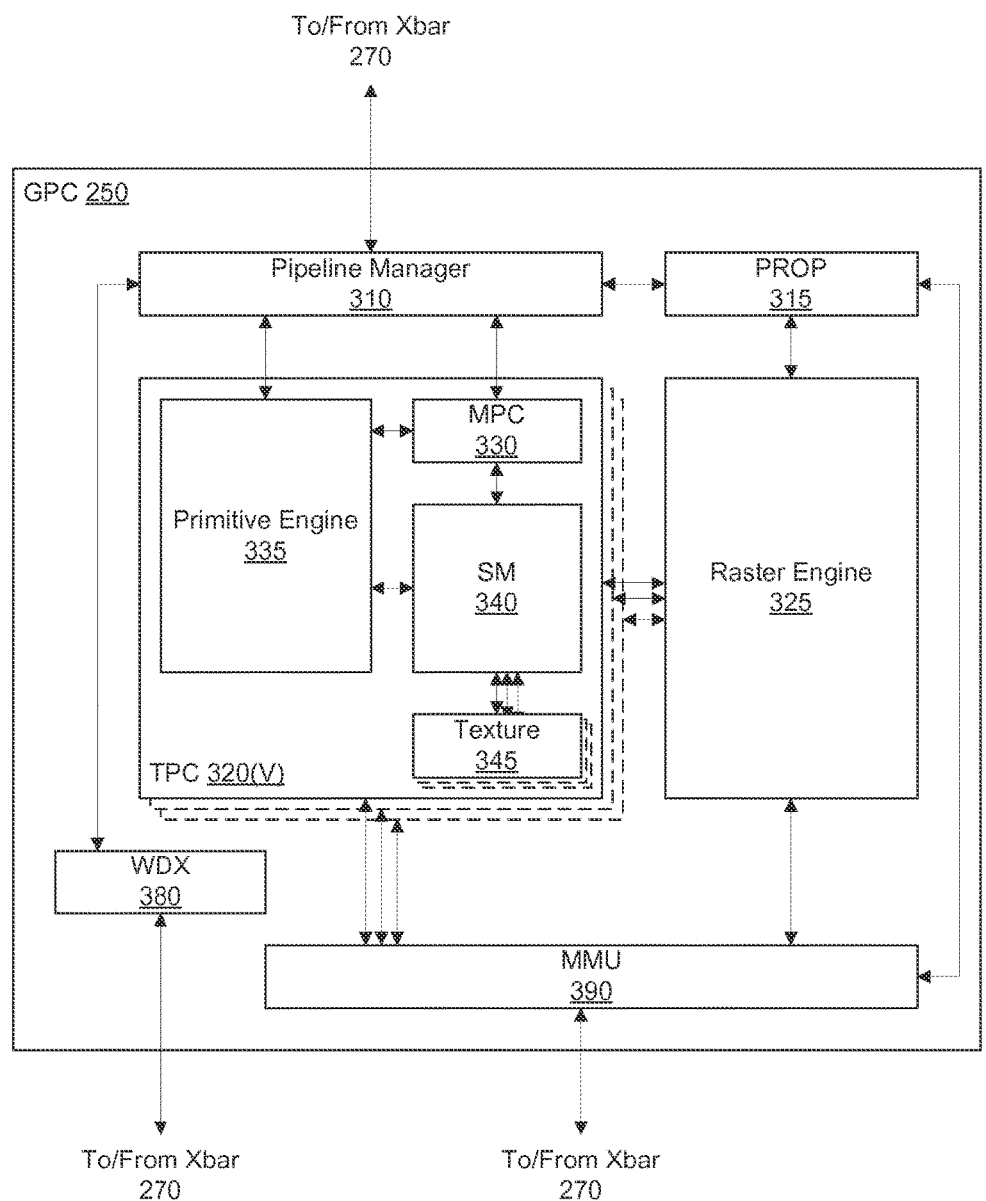
FIG. 3A illustrates a general processing cluster of the parallel processing unit of FIG. 2, in accordance with one embodiment.

FIG. 3A illustrates a GPC 250 of the PPU 200 of FIG. 2, in accordance with one embodiment. As shown in FIG. 3A, each GPC 250 includes a number of hardware units for processing tasks. In one embodiment, each GPC 250 includes a pipeline manager 310, a pre-raster operations unit (PROP) 315, a raster engine 325, a work distribution crossbar (WDX) 380, a memory management unit (MMU) 390, and one or more Texture Processing Clusters (TPCs) 320. It will be appreciated that the GPC 250 of FIG. 3A may include other hardware units in lieu of or in addition to the units shown in FIG. 3A.

In one embodiment, the operation of the GPC 250 is controlled by the pipeline manager 310. The pipeline manager 310 manages the configuration of the one or more TPCs 320 for processing tasks allocated to the GPC 250. In one embodiment, the pipeline manager 310 may configure at least one of the one or more TPCs 320 to implement at least a portion of a graphics rendering pipeline. For example, a TPC 320 may be configured to execute a vertex shader program on the programmable streaming multiprocessor (SM) 340. The pipeline manager 310 may also be configured to route packets received from the Xbar 270 to the appropriate logical units within the GPC 250. For example, some packets may be routed to fixed function hardware units in the PROP 315 and/or raster engine 325 while other packets may be routed to the TPCs 320 for processing by the primitive engine 335 or the SM 340.

The PROP unit 315 is configured to route data generated by the raster engine 325 and the TPCs 320 to a Raster Operations (ROP) unit in the memory partition unit 280, described in more detail below. The PROP unit 315 may also be configured to perform optimizations for color blending, organize pixel data, perform address translations, and the like.

The raster engine 325 includes a number of fixed function hardware units configured to perform various raster operations. In one embodiment, the raster engine 325 includes a setup engine, a coarse raster engine, a culling engine, a clipping engine, a fine raster engine, and a tile coalescing engine. Primitives lying outside a viewing frustrum may be clipped by the clipping engine. The setup engine receives transformed vertices that lie within the viewing plane and generates edge equations associated with the geometric primitive defined by the vertices. The edge equations are transmitted to the coarse raster engine to determine the set of pixel tiles covered by the primitive. The output of the coarse raster engine may be transmitted to the culling engine where tiles associated with the primitive that fail a hierarchical z-test are culled. Those fragments that survive culling may be passed to a fine raster engine to generate coverage information based on the edge equations generated by the setup engine. The output of the raster engine 380 comprises fragments to be processed, for example, by a fragment shader implemented within a TPC 320.

Each TPC 320 included in the GPC 250 includes an M-Pipe Controller (MPC) 330, a primitive engine 335, an SM 340, and one or more texture units 345. The MPC 330 controls the operation of the TPC 320, routing packets received from the pipeline manager 310 to the appropriate units in the TPC 320. For example, packets associated with a vertex may be routed to the primitive engine 335, which is configured to fetch vertex attributes associated with the vertex from the memory 204. In contrast, packets associated with a shader program may be transmitted to the SM 340.

In one embodiment, the texture units 345 are configured to load texture maps (e.g., a 2D array of texels) from the memory 204 and sample the texture maps to produce sampled texture values for use in shader programs executed by the SM 340. The texture units 345 implement texture operations such as filtering operations using mip-maps (i.e., texture maps of varying levels of detail). In one embodiment, each TPC 320 includes two (2) texture units 345.

The SM 340 comprises a programmable streaming processor that is configured to process tasks represented by a number of threads. Each SM 340 is multi-threaded and configured to execute a plurality of threads (e.g., 32 threads) from a particular group of threads concurrently. In one embodiment, the SM 340 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 340 implements a SIMT (Single-Instruction, Multiple Thread) architecture where each thread in a group of threads is configured to process a different set of data based on the same set of instructions, but where individual threads in the group of threads are allowed to diverge during execution. In other words, when an instruction for the group of threads is dispatched for execution, some threads in the group of threads may be active, thereby executing the instruction, while other threads in the group of threads may be inactive, thereby performing a no-operation (NOP) instead of executing the instruction. The SM 340 may be described in more detail below in conjunction with FIG. 4.

The MMU 390 provides an interface between the GPC 250 and the memory partition unit 280. The MMU 390 may provide translation of virtual addresses into physical addresses, memory protection, and arbitration of memory requests. In one embodiment, the MMU 390 provides one or more translation lookaside buffers (TLBs) for improving translation of virtual addresses into physical addresses in the memory 204.

Figure 3B:
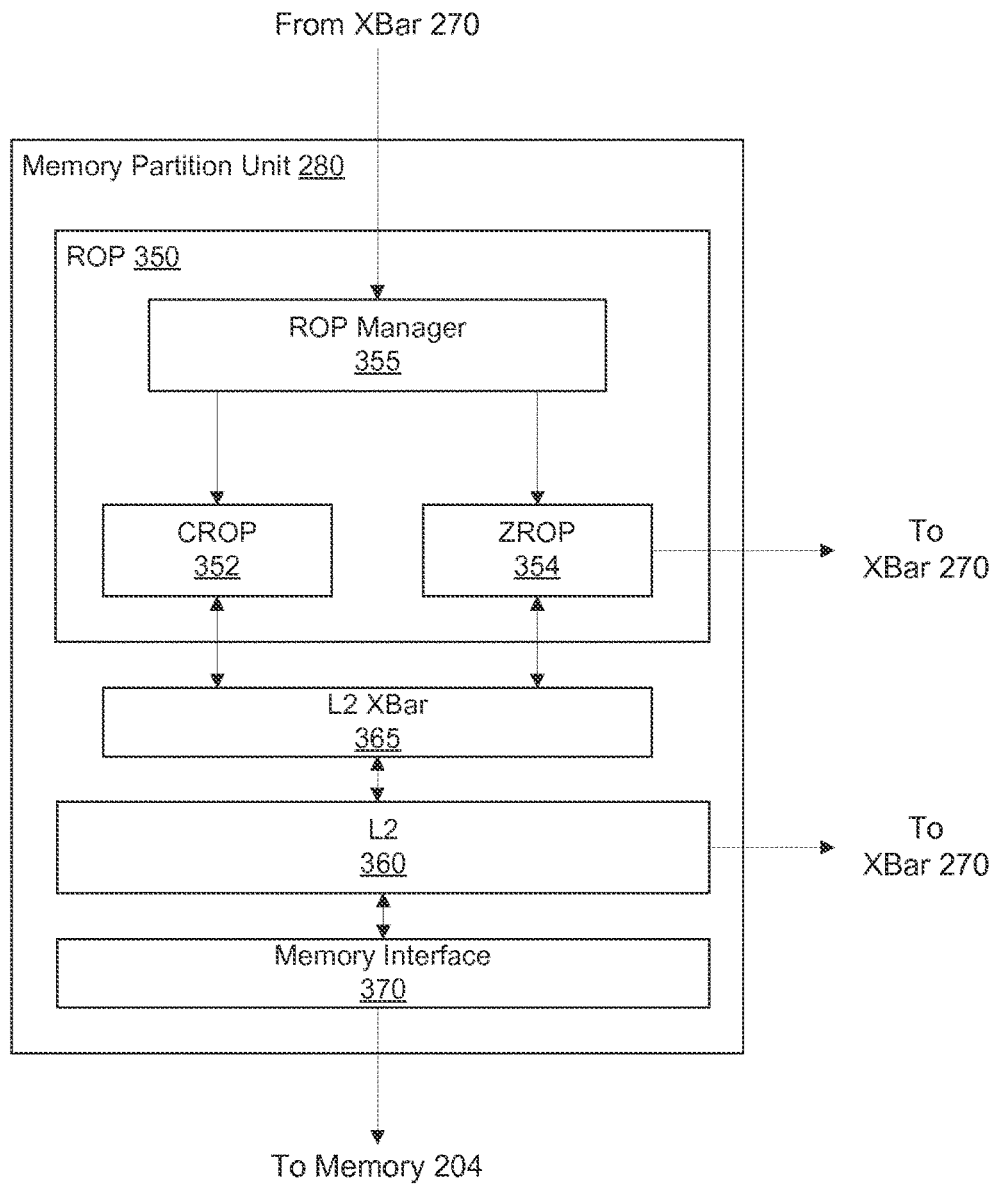
FIG. 3B illustrates a partition unit of the parallel processing unit of FIG. 2, in accordance with one embodiment.

FIG. 3B illustrates a memory partition unit 280 of the PPU 200 of FIG. 2, in accordance with one embodiment. As shown in FIG. 3B, the memory partition unit 280 includes a Raster Operations (ROP) unit 350, a level two (L2) cache 360, a memory interface 370, and an L2 crossbar (XBar) 365. The memory interface 370 is coupled to the memory 204. Memory interface 370 may implement 16, 32, 64, 128-bit data buses, or the like, for high-speed data transfer. In one embodiment, the PPU 200 comprises U memory interfaces 370, one memory interface 370 per memory partition unit 280, where each memory partition unit 280 is connected to a corresponding memory device 204. For example, PPU 200 may be connected to up to U memory devices 204, such as graphics double-data-rate, version 5, synchronous dynamic random access memory (GDDR5 SDRAM). In one embodiment, the memory interface 370 implements a DRAM interface and U is equal to 6.

In one embodiment, the PPU 200 implements a multi-level memory hierarchy. The memory 204 is located off-chip in SDRAM coupled to the PPU 200. Data from the memory 204 may be fetched and stored in the L2 cache 360, which is located on-chip and is shared between the various GPCs 250. As shown, each memory partition unit 280 includes a portion of the L2 cache 360 associated with a corresponding memory device 204. Lower level caches may then be implemented in various units within the GPCs 250. For example, each of the SMs 340 may implement a level one (L1) cache. The L1 cache is private memory that is dedicated to a particular SM 340. Data from the L2 cache 360 may be fetched and stored in each of the L1 caches for processing in the functional units of the SMs 340. The L2 cache 360 is coupled to the memory interface 370 and the XBar 270.

The ROP unit 350 includes a ROP Manager 355, a Color ROP (CROP) unit 352, and a Z ROP (ZROP) unit 354. The CROP unit 352 performs raster operations related to pixel color, such as color compression, pixel blending, and the like. The ZROP unit 354 implements depth testing in conjunction with the raster engine 325. The ZROP unit 354 receives a depth for a sample location associated with a pixel fragment from the culling engine of the raster engine 325. The ZROP unit 354 tests the depth against a corresponding depth in a depth buffer for a sample location associated with the fragment. If the fragment passes the depth test for the sample location, then the ZROP unit 354 updates the depth buffer and transmits a result of the depth test to the raster engine 325. The ROP Manager 355 controls the operation of the ROP unit 350. It will be appreciated that the number of memory partition units 280 may be different than the number of GPCs 250 and, therefore, each ROP unit 350 may be coupled to each of the GPCs 250. Therefore, the ROP Manager 355 tracks packets received from the different GPCs 250 and determines which GPC 250 that a result generated by the ROP unit 350 is routed to. The CROP unit 352 and the ZROP unit 354 are coupled to the L2 cache 360 via an L2 XBar 365.

Figure 4:
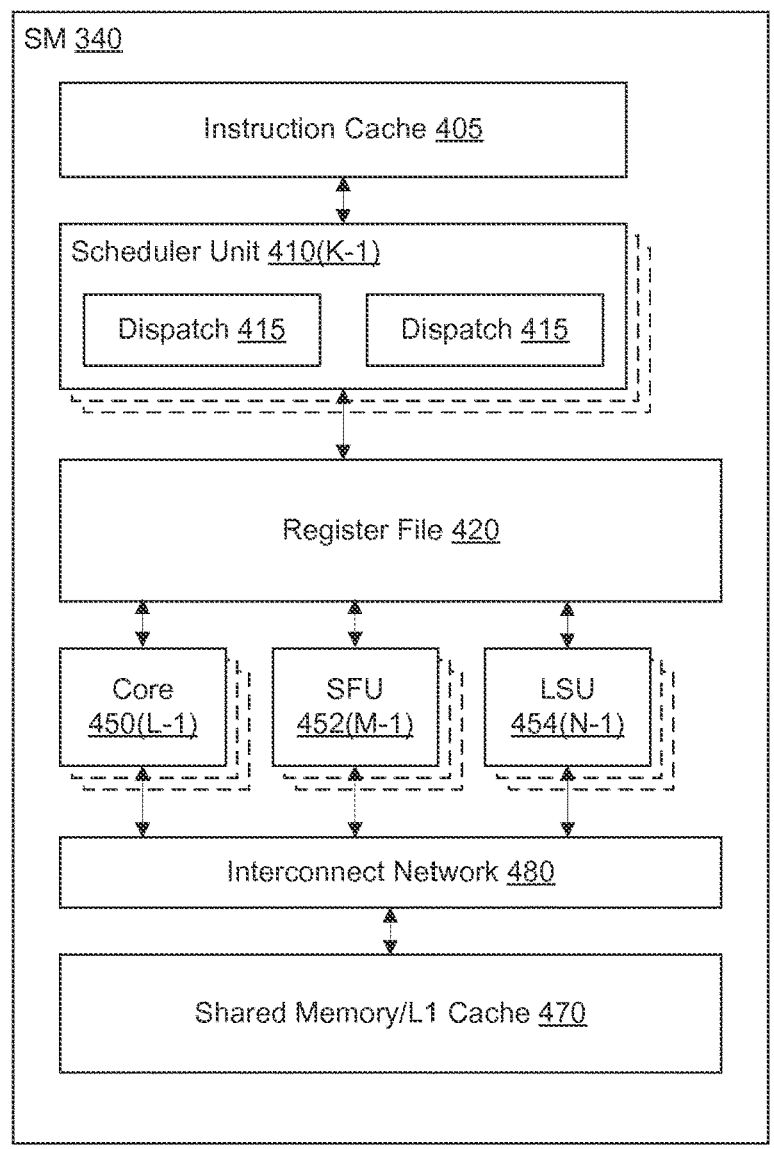
FIG. 4 illustrates the streaming multi-processor of FIG. 3A, in accordance with one embodiment.

FIG. 4 illustrates the streaming multi-processor 340 of FIG. 3A, in accordance with one embodiment. As shown in FIG. 4, the SM 340 includes an instruction cache 405, one or more scheduler units 410, a register file 420, one or more processing cores 450, one or more special function units (SFUs) 452, one or more load/store units (LSUs) 454, an interconnect network 480, and a shared memory/L1 cache 470.

As described above, the compute work distribution unit 225 and the graphics primitive distribution unit 230 dispatch tasks for execution on the GPCs 250 of the PPU 200. The tasks are allocated to a particular TPC 320 within a GPC 250 and, if the task is associated with a shader program, the task may be allocated to an SM 340. A scheduler unit 410 receives the tasks from the compute work distribution unit 225 and the graphics primitive distribution unit 230 and manages instruction scheduling for one or more groups of threads (i.e., warps) assigned to the SM 340. Each SM 340 may include K scheduler units 410 (i.e., 410(0) . . . 410(K−1)). The scheduler unit 410 schedules threads for execution in groups of parallel threads, where each group is called a warp. In one embodiment, each warp includes 32 threads. The scheduler unit 410 may manage a plurality of different warps, scheduling the warps for execution and then dispatching instructions from the plurality of different warps to the various functional units (i.e., cores 350, SFUs 352, and LSUs 354) during each clock cycle.

In one embodiment, each scheduler unit 410 includes one or more instruction dispatch units 415. Each dispatch unit 415 is configured to transmit instructions to one or more of the functional units. In the embodiment shown in FIG. 4, the scheduler unit 410 includes two dispatch units 415 that enable two different instructions from the same warp to be dispatched during each clock cycle. In alternative embodiments, each scheduler unit 410 may include a single dispatch unit 415 or additional dispatch units 415.

Each SM 340 includes a register file 420 that provides a set of registers for the functional units of the SM 340. In one embodiment, the register file 420 is divided between subsets of the functional units such that each subset is allocated a dedicated portion of the register file 420. In another embodiment, the register file 420 is divided between the different warps being executed by the SM 340. The register file 420 provides temporary storage for operands connected to the data paths of the functional units.

Each SM 340 comprises L processing cores 450 (i.e., 450(0) . . . 450(L−1)). In one embodiment, the SM 340 includes a large number (e.g., 192, etc.) of distinct processing cores 450. Each core 450 may include a fully-pipelined, single-precision processing unit that includes a floating point arithmetic logic unit and an integer arithmetic logic unit. The core 450 may also include a double-precision processing unit including a floating point arithmetic logic unit. In one embodiment, the floating point arithmetic logic units implement the IEEE 754-2008 standard for floating point arithmetic. Each SM 340 also comprises M SFUs 452 (i.e., 452(0) . . . 452(M−1)) that perform special functions (e.g., transcendental function evaluation, attribute interpolation, and the like), and N LSUs 454 (i.e., 454(0) . . . 454(N−1)) that implement load and store operations between the shared memory/L1 cache 470 and the register file 420. In one embodiment, the SM 340 includes 192 cores 450, 32 SFUs 452, and 32 LSUs 454.

Each SM 340 includes an interconnect network 480 that connects each of the functional units to the register file 420 and the shared memory/L1 cache 470. In one embodiment, the interconnect network 480 is a crossbar that can be configured to connect any of the functional units to any of the registers in the register file 420 or the memory locations in shared memory/L1 cache 470.

The shared memory/L1 cache 470 is an array of on-chip memory that, in one embodiment, may be configured as either shared memory or an L1 cache, or a combination of both, as the application demands. For example, the shared memory/L1 cache 470 may comprise 64 kB of storage capacity. The shared memory/L1 cache 470 may be configured as 64 kB of either shared memory or L1 cache, or a combination of the two such as 16 kB of L1 cache and 48 kB of shared memory.

The PPU 200 described above may be configured to perform highly parallel computations much faster than conventional CPUs. Parallel computing has advantages in graphics processing, data compression, biometrics, stream processing algorithms, and the like.

In one embodiment, the PPU 200 comprises a graphics processing unit (GPU). The PPU 200 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 200 can be configured to process the graphics primitives to generate a frame buffer (i.e., pixel data for each of the pixels of the display).

An application writes model data for a scene (i.e., a collection of vertices and attributes) to a memory such as a system memory or memory 204. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be executed on the SMs 340 of the PPU 200 including one or more of a vertex shader, hull shader, domain shader, geometry shader, and a pixel shader. For example, one or more of the SMs 340 may be configured to execute a vertex shader program that processes a number of vertices defined by the model data. In one embodiment, the different SMs 340 may be configured to execute different shader programs concurrently. For example, a first subset of SMs 340 may be configured to execute a vertex shader program while a second subset of SMs 340 may be configured to execute a pixel shader program. The first subset of SMs 340 processes vertex data to produce processed vertex data and writes the processed vertex data to the L2 cache 360 and/or the memory 204. After the processed vertex data is rasterized (i.e., transformed from three-dimensional data into two-dimensional data in screen space) to produce fragment data, the second subset of SMs 340 executes a pixel shader to produce processed fragment data, which is then blended with other processed fragment data and written to the frame buffer in memory 204. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The PPU 200 may be included in a desktop computer, a laptop computer, a tablet computer, a smart-phone (e.g., a wireless, hand-held device), personal digital assistant (PDA), a digital camera, a hand-held electronic device, and the like. In one embodiment, the PPU 200 is embodied on a single semiconductor substrate. In another embodiment, the PPU 200 is included in a system-on-a-chip (SoC) along with one or more other logic units such as a reduced instruction set computer (RISC) CPU, a memory management unit (MMU), a digital-to-analog converter (DAC), and the like.

In one embodiment, the PPU 200 may be included on a graphics card that includes one or more memory devices 204 such as GDDR5 SDRAM. The graphics card may be configured to interface with a PCIe slot on a motherboard of a desktop computer that includes, e.g., a northbridge chipset and a southbridge chipset. In yet another embodiment, the PPU 200 may be an integrated graphics processing unit (iGPU) included in the chipset (i.e., Northbridge) of the motherboard.

Tree Traversal Unit

Figure 5A:
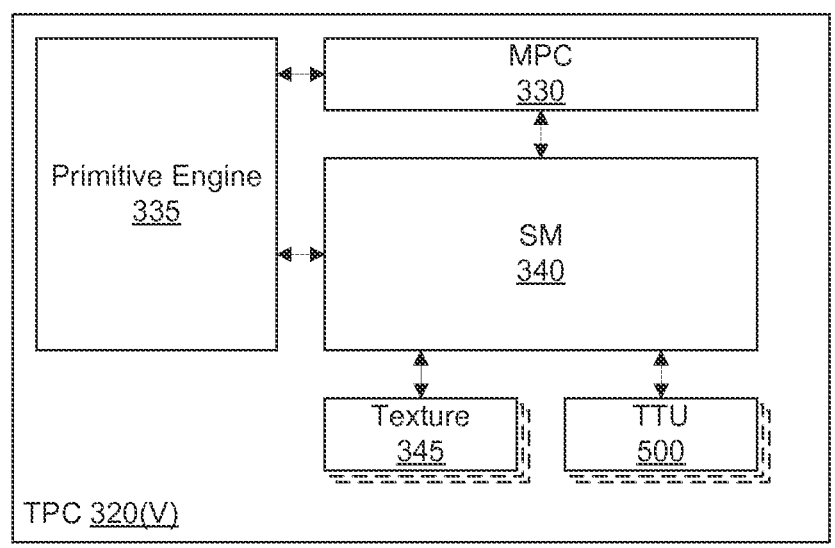
FIG. 5A illustrates a texture processing cluster of FIG. 3A, modified to include one or more tree traversal units, in accordance with one embodiment.

FIG. 5A illustrates a TPC 320 of FIG. 3A, modified to include one or more tree traversal units (TTUs) 500, in accordance with one embodiment. The TTUs 500 are each configured to perform tree traversal operations. Tree traversal operations are commonly utilized in, for example, ray tracing algorithms in computer graphics. However, the TTUs 500 may be optimized for general tree traversal operations and are not limited, specifically, to ray tracing techniques.

In one embodiment, each TPC 320 included in the PPU 200 may include one or more TTUs 500 for performing tree traversal operations. The TTUs 500 are coupled to the SM 340 similar to the texture units 345. It will be appreciated, that in alternate embodiments, the TTUs 500 may be included in the SM 340 similar to the cores 450 or the SFUs 452. Alternately, one or more TTUs 500 may be implemented within the PPU 200 and shared by one or more GPCs 250 or one or more SMs 340.

A tree traversal operation may include any operation performed by traversing the nodes of a tree data structure. A tree data structure may include, but is not limited to, a binary tree, an octree, a four-ary tree, a k-d tree, a binary space partitioning (BSP) tree, and a bounding volume hierarchy (BVH) tree. In one embodiment, the tree traversal operation includes a number of instructions for intersection a query shape with the tree. The query shapes may be, e.g., rays, bounding boxes, frustums, cones, spheres, and the like. In various embodiments, a query shape may be specified by a query data structure. The query data structure may include any technically feasible technique for specifying the query shape to intersect with the tree. For example, the query data structure may specify the starting and ending points of a ray using two three-coordinate vectors. In another example, the query data structure may specify the six planes of an axis-aligned bounding box using six 32-bit floating point coordinates. The various query data structures may include any number of fields for specifying the attributes of the query shape.

For example, one type of tree traversal operation for which the TTU 500 may be optimized is to intersect a ray with a BVH data structure that represents each of the geometric primitives in a 3D scene or 3D model. The TTU 500 may be particularly useful in ray-tracing applications in which millions or even billions of rays are intersected with the geometric primitives of a 3D model represented by a BVH data structure.

Figure 5B:
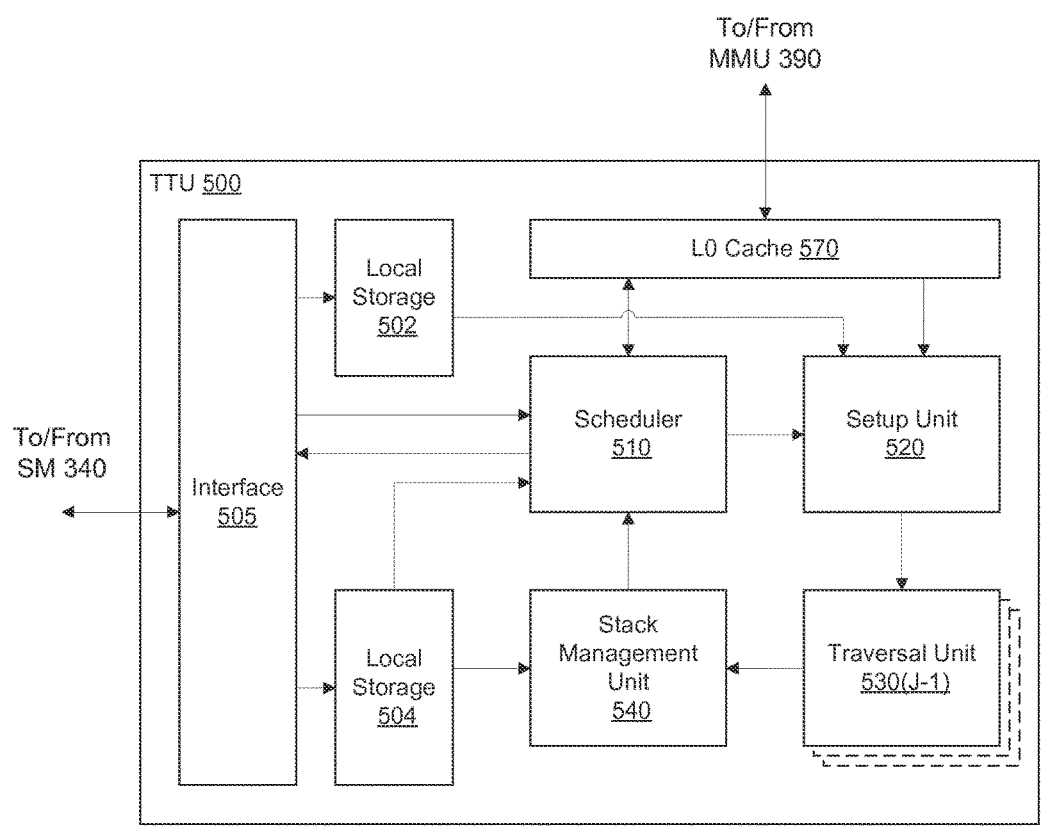
FIG. 5B illustrates a tree traversal unit of FIG. 5A, in accordance with one embodiment.

FIG. 5B illustrates a TTU 500 of Figure 5A, in accordance with one embodiment. As shown in FIG. 5B, the TTU 500 includes an interface 505, a scheduler unit 510, a setup unit 520, one or more traversal units 530, and a stack management unit 540. The TTU 500 also includes a level-zero (L0) cache unit 570 coupled to a memory architecture hierarchy including one or more L2 caches 360 and memory units 204 via the MMU 390. The TTU 500 also includes local storage 502 for a plurality of query data structures and local storage 504 for a plurality of stack data structures. The local storage 502 and the local storage 504 may be, e.g., static RAM, a latch array, a register file, or the like. It will be appreciated that the TTU 500 may include other hardware units in addition to or in lieu of the hardware units shown in FIG. 5B.

The interface 505 may receive instructions and/or data for performing tree traversal operations from the SM 340. In one embodiment, the SM 340 may transmit the instructions and/or data directly to the interface 505 via a plurality of dedicated interconnects (e.g., wires, paths in a metal layer of a semiconductor, etc.). In another embodiment, the SM 340 may write the instructions to one or more special registers associated with the TTU 500, and the interface 505 may monitor the registers for any updates from the SM 340.

The instructions may include instructions for configuring the TTU 500 to perform a tree traversal operation. The instructions may include operands such as pointers that direct the TTU 500 to a tree data structure and/or a query data structure are located in the memory 204. The interface 505 may cause, at least a portion of, the tree data structure and/or the query data structure to be fetched into the L0 cache unit 570 or the local storage 502.

The L0 cache unit 570 is coupled to the MMU 390 and provides a low-level, local access to the memory architecture hierarchy of the PPU 200. In one embodiment, the L0 cache unit 570 includes a number of entries, where each entry is sized according to a size of a cache line in the memory architecture hierarchy. For example, the L2 cache 360 associated with the memory 204 may implement a cache line having L bytes of information, and the L0 cache unit 570 may include M entries of L bytes to enable up to M cache lines to be stored in the L0 cache unit 570. In one embodiment, the L0 cache unit 570 may include eight entries for cache lines having 128 bytes of data. Of course, the size and number of entries in the L0 cache unit 570 may vary widely between different architectures and other cache line sizes and number of entries are contemplated as being within the scope of various embodiments. Furthermore, the L0 cache unit 570 may include logic in addition to the raw data storage for fetching cache lines from the memory 204 and/or the other hierarchical cache units. For example, the logic may include hardware configured to select particular entries in the L0 cache unit 570 to evict in order to enable other data to be fetched into the L0 cache unit 570. The logic may also include hardware for maintaining cache coherency. For example, the logic may determine when write-back operations need to be performed for dirty cache lines.

In one embodiment, the query data structure associated with a particular tree traversal operation is stored in the local storage 502. The query data structure may specify a query shape to be intersected with a tree data structure. The interface 505 may receive the data for the query data structure and store the data in an available memory location in the local storage 502. The interface 505 may also initialize a stack data structure associated with the query data structure in the local storage 504. The stack data structure may include a portion of memory for creating a stack associated with the particular tree traversal operation. In one embodiment, the stack data structure is initialized by allocating a portion of the local storage 504 to a particular tree traversal operation and pushing a root node for a tree data structure onto the stack data structure. It will be appreciated that pushing a root node onto the stack data structure may be performed by storing a pointer to a data structure for the root node of the tree data structure in a memory location associated with the stack data structure.

The interface 505 may notify the scheduler 510 of an event when the interface 505 receives an instruction that causes a tree traversal operation to be launched by the TTU 500. The event may indicate that the TTU 500 has been tasked with performing a tree traversal operation for a particular tree data structure and a particular query data structure. The scheduler 510 may receive notice of the event via a signal. The signal may be a token that is passed to the scheduler 510 via a data communication channel. The token may include an identifier associated with a particular query data structure stored in the local storage 502.

The scheduler 510 may include a queue (e.g., first-in, first-out or FIFO, etc.) that includes a number of slots that store identifiers for query data structures associated with tree traversal operations. Identifiers may be unique within the scope of the TTU 500. In other words, each identifier uniquely identifies a particular query data structure stored in the local storage 502. In one embodiment, identifiers are allocated to query data structures dynamically when the query data structures are stored in the local storage 502. The queue may be used such that a number of different tree traversal operations may be in-flight in the TTU 500 at any given time, and the queue may be implemented, at least in part, to hide the latency associated with memory operations for fetching node data from the memory 204 into the L0 cache unit 570. In one embodiment, the queue includes, e.g., 32 slots for storing a number of identifiers for query data structures to be intersected with the tree data structure. The total number of slots may be increased or decreased based on latency associated with memory operations, which may be dependent, at least in part, on the details of the memory architecture hierarchy.

The scheduler 510 may also maintain status entries for tracking the status of the tree traversal operations associated with each of the query data structures referenced by identifiers stored in the queue. The status entries may indicate, for example, a scheduling priority for a particular tree traversal operation, whether data associated with the next node to be tested in the tree traversal operation is currently stored in the L0 cache unit 570, whether the tree traversal operation associated with a particular query data structure is currently being processed by the one or more traversal units 530, or whether results for a particular tree traversal operation are available in the memory 204. The scheduler 510 may also notify the SM 340, via the interface 505, of certain events, such as notifying the SM 340 that the data for a particular tree traversal operation is available in the memory 204 or in the register file 420 of the SM 340, or notifying the SM 340 that the queue in the scheduler 510 is full.

Once the scheduler 510 has received an event notification from the interface 505 indicating that the tree traversal operation should be launched, the scheduler 510 may begin to manage the execution of the tree traversal operation. In one embodiment, the scheduler 510 may pop the top element from the stack data structure in the local storage 504 associated with the tree traversal operation. The top element may include a pointer to a location of a node of the tree data structure in the memory 204. The scheduler 510 may issue one or more fetch commands to the L0 cache unit 570 to fetch data associated with the node into the L0 cache unit 570. The fetch commands may include an address of the data to be fetched. For example, the address may point to a root node for a block of the tree data structure. The L0 cache unit 570 will determine if the requested data is in the L0 cache unit 570. If the data is not currently stored in the L0 cache unit 570, then the fetch request results in a cache miss and the data will be fetched from the memory architecture hierarchy, such as L2 cache unit 360 or memory 204, as required. Once the data has been returned from the memory architecture hierarchy, the L0 cache unit 570 will inform the scheduler 510 that the data is available. If the data is currently stored in the L0 cache unit 570, then the fetch request results in a cache hit and the L0 cache unit 570 will inform the scheduler 510 that the data is immediately available. It will be appreciated that the data associated with a particular node may be included in data associated with a plurality of nodes of the tree data structure that are stored in contiguous memory and comprise a single cache line. Therefore, each fetch request may result in data for more than one node being loaded into the L0 cache unit 570.

Once the data has been fetched into the L0 cache unit 570, the scheduler 510 transmits a request to the setup unit 520 to initiate the tree traversal operation for one or more nodes of the tree data structure. The setup unit 520 may perform any number of operations for configuring the one or more traversal units 530 to perform the tree traversal operation. For example, in one embodiment, the setup unit 520 may fetch the data associated with the query data structure and the data associated with one or more nodes of the tree data structure from the local storage 502 and the L0 cache unit 570, respectively. In another embodiment, the setup unit 520 may transform coordinates associated with the query data structure from a global coordinate system into a local coordinate system. In another embodiment, the setup unit 520 may configure one or more traversal units 530 to execute instructions for performing the tree traversal operation for one or more nodes of the tree data structure.

In one embodiment, the TTU 500 is configured to perform tree traversal operations on blocks of a tree data structure. As used herein, a block may include one or more nodes of the tree data structure that fit within a particular cache line. The block may include a block root node having zero or more child nodes that are also included in the block. Each of the zero or more child nodes may also include corresponding child nodes, those corresponding child nodes may include one or more additional child nodes, and so forth. Some or all of the corresponding child nodes and/or the additional child nodes may also be included in the block. A block may be defined as no larger than a cache line (e.g., 128 bytes, etc.) and may contain a fixed or variable number of nodes. It will be appreciated that the tree data structure may include a plurality of blocks that together represent all of the nodes in the tree data structure.

The one or more traversal units 530 may receive data for a particular query data structure to intersect with one or more nodes of the tree data structure. Each traversal unit 530 may be configured to test each of the child nodes of a particular node for intersection with the query data structure. If the query data structure intersects the child node, then the child node is added to a local stack data structure. Once all of the child nodes of the particular node have been tested, then the traversal unit 530 may be configured to check the local stack data structure. If the local stack data structure is empty, then no nodes need to be tested for intersection with the query data structure, and the traversal unit 530 may notify the stack management unit 540 that the tree traversal operation has been completed, at least for the nodes in that particular block of the tree data structure. However, if the local stack data structure is not empty, then the top element is popped from the local stack data structure and the process is repeated for this new node.

If a particular node being tested by the traversal unit 530 is a leaf node and is intersected by the query data structure, then the elements associated with the leaf node may be added to a result queue. If the particular node being tested by the traversal unit 530 is an internal node that is included in another block of the tree data structure, then the node included in the other block may be added to a result queue.

In one embodiment, the traversal units 530 may implement a pipelined architecture in order to hide latency associated with a particular operation performed for each node. For example, a pipelined architecture may be implemented for an intersection test that takes a number of cycles to complete such that a number of intersection tests for different nodes and different query data structures may be in flight at any given time within a traversal unit 530. In other words, each traversal unit 530 may be performing tree traversal operations for a number of different nodes and a number of different query data structures substantially simultaneously.

In one embodiment, each traversal unit 530 includes a local storage for storing a number of different blocks of the tree data structure. The local storage may be a temporary location comprising static RAM for storing one or more cache lines included in the L0 cache unit 570 and needed for performing a tree traversal operation for a particular query data structure. For example, the local storage may include 5 slots of 128 bytes for storing up to five cache lines from the L0 cache unit 570 that include data for up to five different blocks of the tree data structure (or different tree data structures). The data in up to four of the slots in the local storage may be accessed by the logic of the traversal unit 530 during any given clock cycle, and data for the remaining slot may be written to the local storage by the setup unit 520 during the clock cycle. Each traversal unit 530 may also include local storage for storing a number of query data structures. The number of query data structures stored locally in the traversal unit 530 may be equal to the number of available slots for storing blocks of the tree data structure. Similarly, each traversal unit 530 may include local storage for storing a number of local stack data structures used for traversing the different blocks of the tree data structure.

The stack management unit 540 receives the results of a tree traversal operation from the result queue. The result queue may include leaf data such as a geometric primitive to be tested for intersection with a query shape as well as nodes (or rather pointers to nodes) included in other blocks of the tree data structure. In one embodiment, the stack management unit 540 transmits leaf data such as the geometric primitives to the SM 340. As described herein, the leaf data may represent those elements stored in the tree data structure that are potentially intersected by the query data structure. The SM 340 may be configured to process the results of the tree traversal operation by any means necessary. For example, if the results of the tree traversal operation include a set of geometric primitives, the SM 340 may be configured to test those particular geometric primitives for intersection with the query data structure. It will be appreciated that testing a geometric primitive included in a leaf node, such as a triangle or quad, for intersection with the query data structure is a different type of operation than testing a leaf node, associated with a bounding volume, for intersection with the query data structure. The SM 340 may also be configured to launch one or more additional tree traversal operations for new query data structures based on the processing of the geometric primitives included in the results.

The stack management unit 540 may also manage traversal stacks for each of the tree traversal operations currently being executed by the TTU 500. A traversal stack may refer to a data structure that temporarily stores particular nodes in the tree data structure that need to be tested against the query data structure during future iterations of the processing loop. A non-empty traversal stack that includes one or more nodes of the tree data structure indicates that at least a portion of the tree traversal operation still needs to be scheduled for execution by the one or more traversal units 530.

When the stack management unit 540 receives a pointer to a node for a new block of the tree data structure in the result queue, the stack management unit 540 adds the node to the traversal stack for a particular tree traversal operation. The stack management unit 540 may be notified once the one or more traversal units 530 have completed testing the nodes of a given block of the tree data structure. In one embodiment, the one or more traversal units 530 may notify the stack management unit 540 of an event by including a signal and/or data in the result queue that indicates the one or more traversal units 530 have completed executing the tree traversal operation for a block of the tree data structure. Once the stack management unit 540 receives the event, the stack management unit 540 may cause the scheduler 510 to initiate the next portion of the tree traversal operation for a different block associated with a node included in the traversal stack. In other words, the scheduler unit 510 may retrieve the top element (i.e., a new node) from the traversal stack included in the local storage 504, fetch any data required for performing the tree traversal operation for the new node into the L0 cache unit 570 and/or local storage 502, and notify the setup unit 520 to configure the one or more traversal units 530 to perform the tree traversal operation for one or more nodes in the new block of the tree data structure.

Although the TTU 500 described above has been described relative to a tree traversal operation for a general query data structure as applied to a general tree data structure, the TTU 500, in some embodiments, may be configured to perform a tree traversal operation for a specific application, such as ray-tracing. In other words, a tree traversal operation may be limited to intersecting a ray with a tree that represents a plurality of geometric primitives. The tree may be implemented as a bounding volume hierarchy (BVH), spatial subdivision tree, and the like. The operation of the TTU 500 as applied to a ray-tracing application in association with a BVH will be described in more detail below.

In order to intersect a ray with the BVH, the SM 340 may transmit an instruction to the interface 505 of the TTU 500. In response to the instruction, the interface 505 may load a ray data structure into the local storage 502 and initialize a traversal stack data structure in the local storage 504. The interface 505 may also push a root node for the BVH onto the traversal stack data structure. The interface 505 may also assign a ray identifier to the ray data structure in the local storage 502 for identifying the particular ray data structure associated with a particular tree traversal operation. In a typical ray-tracing algorithm utilized to create a computer generated image, hundreds, thousands, or even millions of rays may be cast and intersected with the tree data structure. Thus, the ray identifier provides a useful way for tracking and identifying a tree traversal operation in flight in the TTU 500 for a particular ray.

The ray data structure may be stored in the local storage 502 such that the ray data structure may be quickly accessed during the tree traversal operation associated with the ray. A ray may be defined, e.g., by a set of tuples specifying a starting coordinate and an ending coordinate, or, alternately, a starting coordinate, a direction, and a magnitude. The ray data structure may include one or more coordinates for specifying the ray, one or more attributes of the ray, and so forth. In one embodiment, the ray data structure includes two vectors for specifying the endpoints of the ray, each vector comprising three 32-bit floating point values for specifying the coordinates of a point relative to a global coordinate system, as well as one or more attributes such as flags that specify how particular types of graphics primitives encountered during the tree traversal operation are to be processed.

The interface 505 may notify the scheduler 510 of a ray event that indicates that the TTU 500 received an instruction requesting a tree traversal operation to be performed for a given ray data structure. The interface 505 may pass a ray identifier for the ray data structure stored in the local storage 502 to the scheduler 510 as part of the ray event.

As long as the queue includes at least one ray identifier that needs to be processed by the one or more traversal units 530, the scheduler 510 may choose a particular tree traversal operation from the queue to be launched on the one or more traversal units 530. The particular tree traversal operation may be selected by selecting one of the ray identifiers included in the queue of the scheduler 510. Any technically feasible means for selecting a particular ray identifier from the queue may be implemented by the scheduler 510, such as a priority-based algorithm, a round-robin algorithm, and the like.

In one embodiment, the scheduler 510 searches the queue for ray identifiers that are ready to be launched. The scheduler 510 may select a particular ray identifier ready to be launched and fetch the top element from the traversal stack data structure corresponding to the ray identifier. The top element may comprise a pointer to a node of the BVH. The scheduler 510 may then issue a fetch request to the L0 cache unit 570 to fetch the data corresponding to the pointer to the node. If the data is not currently stored in the L0 cache unit 570, then the data is fetched from memory and the scheduler 510, during the next clock cycle, may select another ray identifier from the queue to try and launch. However, if the data is currently stored in the L0 cache unit 570, then the scheduler 510 transmits a request to the setup unit 520 to launch the tree traversal operation for that node.

In one embodiment, the node represents the root node for a block of the BVH. The setup unit 520 and one or more traversal units 530 will be configured to traverse all of the nodes of the block, intersecting each node of the block with the ray data structure corresponding to that particular tree traversal operation. In one embodiment, the setup unit 520 fetches the ray data structure associated with the tree traversal operation from the local storage 502. The setup unit 520 may also fetch the data for the block including the node from the L0 cache unit 570. In one embodiment, the setup unit 520 performs one or more operations for preparing to execute the tree traversal operation. For example, in one embodiment, the setup unit 520 transforms the coordinates associated with the ray data structure from a global coordinate system to a local coordinate system associated with a root node of the block. In another embodiment, the setup unit 520 may test the root node of the block for intersection with the ray data structure. If the root node of the block intersects the ray data structure then each of the child nodes of the root node may be passed to a particular traversal unit 530 to continue traversing the BVH in parallel. In one embodiment, the TTU 500 may include four traversal units 530 to test up to eight child nodes for intersection with the ray in parallel. The number of traversal units 530 that are implemented in a given TTU 500 may be optimized for the types of trees that are typically traversed. In yet another embodiment, the setup unit 520 may transmit the root node of the block to one of the available traversal units 530.

When a node is received at a tree traversal unit 530 from the setup unit 520, the node is inserted into a local stack data structure. The local stack data structure is similar to the traversal stack data structure except the depth of the local stack data structure may be limited due to the fixed size of a block of the tree data structure. The traversal unit 530 then enters a loop where the traversal unit 530 determines if the local stack data structure is empty. If the local stack data structure is empty, then the traversal unit 530 has completed the traversal of the block. However, if the local stack data structure is not empty, then the traversal unit 530 pops the top entry from the local stack data structure. If the top entry is a leaf node and the lead node intersects the ray data structure, then the data (e.g., geometric primitives) stored in the leaf node is added to a result queue. However, if the top entry is an internal node (i.e., a node that includes one or more child nodes, etc.), then the ray data structure is intersected with the node to determine if the ray intersects the node. If the ray data structure does not intersect the node, then nothing is added to the local stack data structure, and the loop is repeated if the local stack data structure is not empty. If the ray data structure intersects the node, then each of the child nodes of the node included in the block are added to the local stack data structure and the loop is repeated. However, if the child nodes of the intersected node are not included in the block (i.e., the child nodes are included in a different block of the tree data structure, etc.), then the child nodes may be added to the result queue. Once the local stack data structure is empty, the tree traversal operation for the block is complete and any data included in the result queue may be passed to the stack management unit 540.

The stack management unit 540 may read the result queue and update the traversal stack data structure in the local storage 504 by adding any child nodes included in the result queue to the top of the traversal stack data structure. The stack management unit 540 may also transmit any geometric primitives included in the result queue to the SM 340. Again, the geometric primitives included in the result queue were those primitives associated with nodes (i.e., bounding volumes) that intersected the ray and, therefore, are the results associated with a particular tree traversal operation intersecting the ray with the BVH. Once the traversal stack data structure in local storage 504 has been updated and the one or more traversal units 530 have indicated to the stack management unit 540 that the tree traversal of the block of the tree data structure is complete, the stack management unit 540 may indicate to the scheduler 510 that the tree traversal operation for the particular ray data structure is ready to be re-launched if the traversal stack data structure is not empty.

The preceding description of the TTU 500, in accordance with one embodiment, utilizes an optimized block-based tree traversal algorithm that is discussed in more detail below. It will be appreciated that the architecture of the TTU 500 may be optimized for different types of tree traversal algorithms, and that the architecture of the TTU 500 may be changed for different algorithms utilized for different types of hardware architectures. The block-based tree traversal algorithm is just one method for optimizing tree traversal operations on high-latency memory architecture systems such as the PPU 200. In one embodiment, the various units of the TTU 500 (e.g., the setup unit 520, the traversal units 530, etc.) may be implemented as fixed function logic, configured to implement the functionality of each of the units described above. In another embodiment, one or more of the units of the TTU 500 may be programmable logic devices that are configured to execute instructions transmitted to the TTU 500 by the SM 340 or read from the memory 204. The units may execute the instructions to implement the functionality of each of the units described above in a programmable manner. For example, the traversal units 530 may be programmable devices configured to execute a program stored in the memory 204 to process one or more nodes of the tree data structure.

Figure 6A:
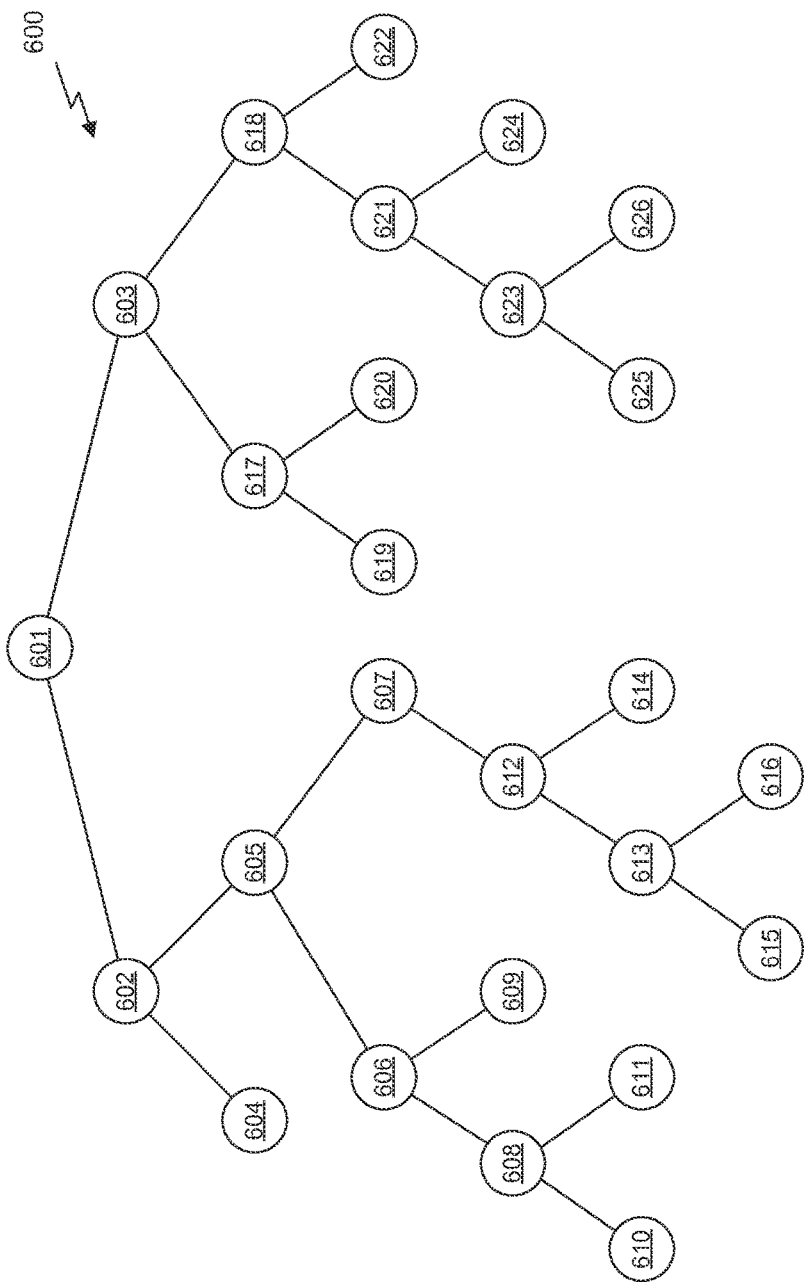
FIGS. 6A & 6B illustrate a typical tree data structure that represents a bounding volume hierarchy (BVH) associated with a 3D model, in accordance with the prior art.
Figure 6B:
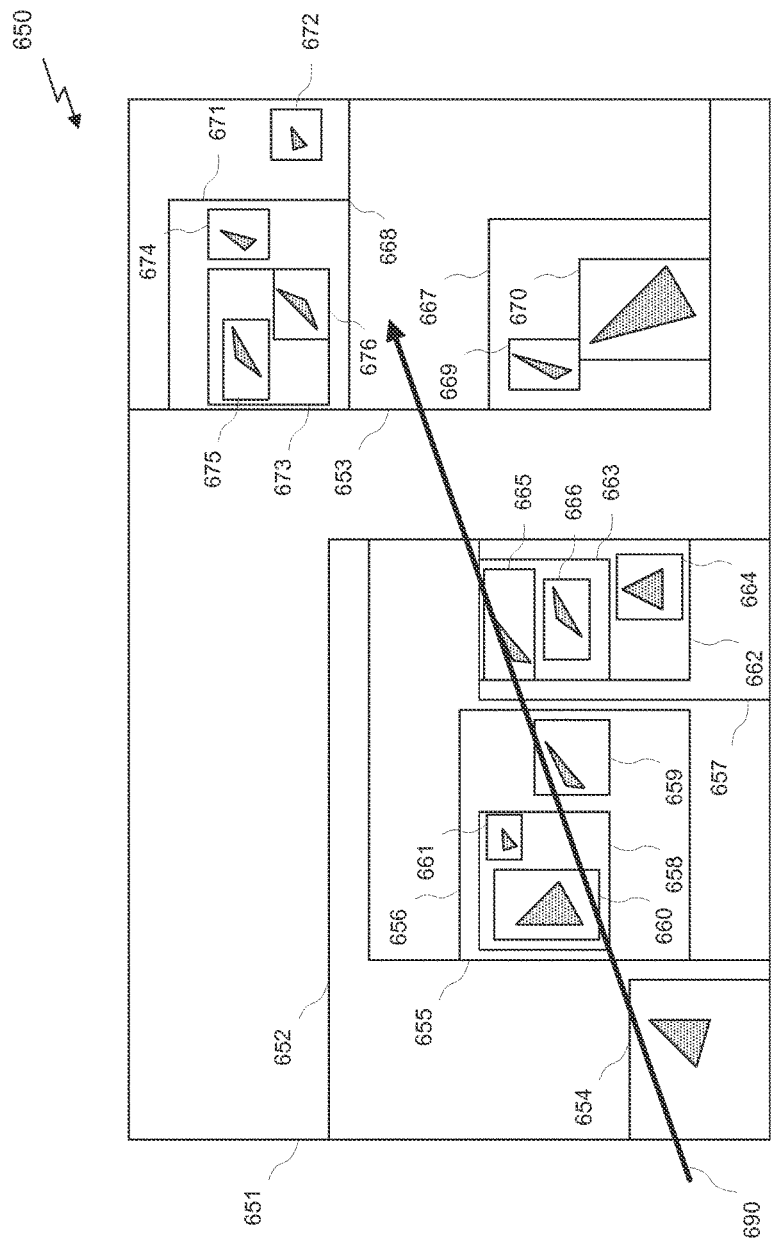

FIGS. 6A & 6B illustrate a typical tree data structure 600 that represents a bounding volume hierarchy (BVH) 650 associated with a 3D model, in accordance with the prior art. The tree data structure 600 includes a plurality of nodes, and each node has zero or more child nodes. The tree data structure 600 includes a root node 601 that indicates the start of the tree data structure 600. All other nodes in the tree data structure 600 descend from the root node 601. Nodes having zero child nodes may be referred to as leaf nodes. Leaf nodes may include one or more elements or a pointer to one or more elements stored in the tree data structure 600. Leaf nodes may be associated with a bounding volume that encloses one or more elements of the 3D model. For example, the elements may include geometric primitives of the 3D model. The tree data structure 600 includes leaf nodes 604, 609, 610, 611, 614, 615, 616, 619, 620, 622, 624, 625, and 626. Nodes that include one or more child nodes may be referred to as internal nodes. Internal nodes may be associated with a bounding volume that encloses the elements of the 3D model associated with the descendent leaf nodes of the internal node. The tree data structure 600 includes internal nodes 601, 602, 603, 605, 606, 607, 608, 612, 613, 617, 618, 621, and 623.

As shown in FIG. 6A, the tree data structure 600 is a binary tree data structure. In one embodiment, the binary tree data structure represents a BVH 650 associated with a 3D scene or 3D model that includes a number of geometric primitives, as shown in FIG. 6B. It will be appreciated that the tree data structure 600 is shown for illustration only and is quite small when compared to tree data structures generated from typical 3D models in, for example, computer graphics. Such tree data structures may contain thousands or millions of nodes.

As shown in FIG. 6B, a 3D model comprising a number of geometric primitives (i.e., the shaded triangles) may be associated with a BVH 650. In other words, each geometric primitive may be associated with a bounding volume that fully encloses the geometric primitive and then multiple geometric primitives in close proximity may be bounded by a higher-level bounding volume. The hierarchy is established through multiple levels of larger and larger bounding volumes until a single bounding volume encloses all of the lower-level bounding volumes. The single bounding volume may be associated with the root node 601 in the tree data structure 600.

It will be appreciated that the illustration of the BVH 650 is shown in two dimensions, rather than three dimensions, and that the bounding volumes are illustrated as bounding rectangles. However, the abstract concepts illustrated herein for a two-dimensional system may be applied equally as well to higher-dimensional system (e.g., a three-dimensional system, etc.) using, for example, axis-aligned bounding boxes (AABB). In addition, the bounding volumes are not limited to AABBs. In other embodiments, bounding volumes may be spheroid, cylindrical, or any other closed geometric surface.

As shown in FIG. 6B, the BVH 650 includes bounding boxes 651, 652, 653, 655, 656, 657, 658, 662, 663, 667, 668, 671, and 673, which correspond to nodes 601, 602, 603, 605, 606, 607, 608, 612, 613, 617, 618, 621, and 623 of the tree data structure 600, respectively. These bounding boxes contain one or more additional lower-level bounding boxes. Similarly, the BVH 650 includes bounding boxes 654, 659, 660, 661, 664, 665, 666, 669, 670, 672, 674, 675, and 676, which correspond to nodes 604, 609, 610, 611, 614, 615, 616, 619, 620, 622, 624, 625, and 626 of the tree data structure 600, respectively. These bounding boxes contain one or more geometric primitives and, therefore, are represented in the tree data structure 600 by the leaf nodes.

FIG. 6B also shows a ray 690 that is associated with a tree traversal operation. Ray-tracing techniques, for example, involve the operation of intersecting a plurality of rays with the geometric primitives of a model. One method of performing the ray-tracing operations is to generate a tree data structure that represents the model. Then, for each ray generated by the rendering algorithm, the ray is tested against the tree data structure to determine which geometric primitives are intersected by the ray. The tree data structure significantly decreases the time required to determine which geometric primitives are intersected by the ray by discarding large groups of geometric primitives when a bounding volume that contains a subset of the geometric primitives is not intersected by the ray.

Transformation Nodes

As discussed above, one issue with trees encoded using a fixed-width encoding technique is that fine details may be difficult to represent when the extents of the scene are large. For example, if a 16 bit fixed-point number in a Qm.n format such as Q5.10 (i.e., 5 integer bit precision, 10 fractional bit precision, and 1 sign bit) is used to represent values within the tree, then only values within a range of [−32.00000, 31.99902] may be encoded. For any Qm.n format signed fixed-point number, the range of values that may be represented is given as $[-(2^m), 2^m-2^{-n}]$ and the precision, which is constant over the range of all values, is given as $2^{-n}$. Therefore, for values represented using a Q5.10 format, fine details having a spatial resolution that is less than $$\frac{1}{1024}$$

(i.e., $2^{-10}$) cannot be represented accurately using this type of format. The range of values that may be encoded with a fixed-width format can be extended by changing the number of bits allocated to the integer portion rather than the fractional portion, which decreases the precision of the encoded values, or by using additional bits to encode the values, such as by using a 32-bit fixed-point format instead of a 16-bit fixed-point format. Examples of other fixed-point formats are Q1.14, which includes the entire range of [−1.0, 1.0], and UQ1.15 for unsigned values in 16-bit fixed point, or Q15.16 in 32-bit fixed-point.

As an alternative to using fixed-point formats, many encoding techniques utilize a fixed-width, floating point format to represent values within the tree. Floating-point formats enable a much larger range of values to be encoded for a particular number of bits when compared to fixed-point formats. However, while the precision of all values encoded using a fixed-point format is constant, the precision of values encoded using a floating-point format is dependent on the magnitude of the value being encoded. In one embodiment, a single-precision, 32-bit floating point format (i.e., FP32) specified by the IEEE 754-2008 standard (i.e., 8 exponent bits, 23 mantissa bits, and 1 sign bit) may be used to encode the values within the tree data structure 700. The precision of floating point numbers varies based on the exponent value and is given as $2^{-n} \times 2^e$ where n is the number of mantissa bits and e is the exponent value (in the FP32 format, the exponent value is biased such that 127 is subtracted from the value of the 8 bit unsigned integer encoded by the 8 exponent bits to get the exponent value of the floating-point value). More precisely, the precision of the FP32 format is given as $2^{-23} \approx 2.384 \times 10^{-7}$, which is then scaled by the exponent factor $2^e$ for a particular value. For example, if two values associated with fine detail are located within a range associated with an exponent value of 10 (e.g., 1028.5625 and 1201.875), then the precision of the floating point values are $$2^{-23} \times 2^{10} = 2^{-13} = \frac{1}{8192} \approx 1.2207 \times 10^{-4}.$$

As the magnitude of the value encoded in a floating-point format increases, the precision of the value decreases. In other words, the spatial resolution of values encoded with a floating-point format varies with the magnitude of the value being encoded.

Consequently, regardless of whether a fixed-point format or a floating-point format is chosen to encode values within the tree data structure, it will be appreciated that the precision of the format is limited if the number of bits used to encode each value is fixed. When the extents of a scene are very large, then fine details having a spatial resolution below a threshold level of precision cannot be accurately encoded. This holds true for both fixed-point formats, where encoding a large range of values necessitates a lower precision, and floating-point formats, where large magnitude values inherently have a lower precision. However, the limitations on the precision of values being encoded assumes that all values expressed in the particular fixed-width format are specified relative to a global coordinate system. One technique for improving the precision of values encoded within the tree data structure 700 utilizing a fixed-width encoding technique is to normalize subsets of values to be expressed relative to a local coordinate system in order to decrease the magnitude of those values. When implemented using a floating-point format and a set of distinct local coordinate systems, the precision of values encoded within the tree data structure 700 may be improved when compared to the precision of values encoded with the floating-point format based on a single global coordinate system. In other words, transforming the global coordinate system into a local coordinate system that is tailored to the specific values encoded within a subset of nodes may be utilized to improve the precision of the values associated with the subset of nodes.

Figure 7A:
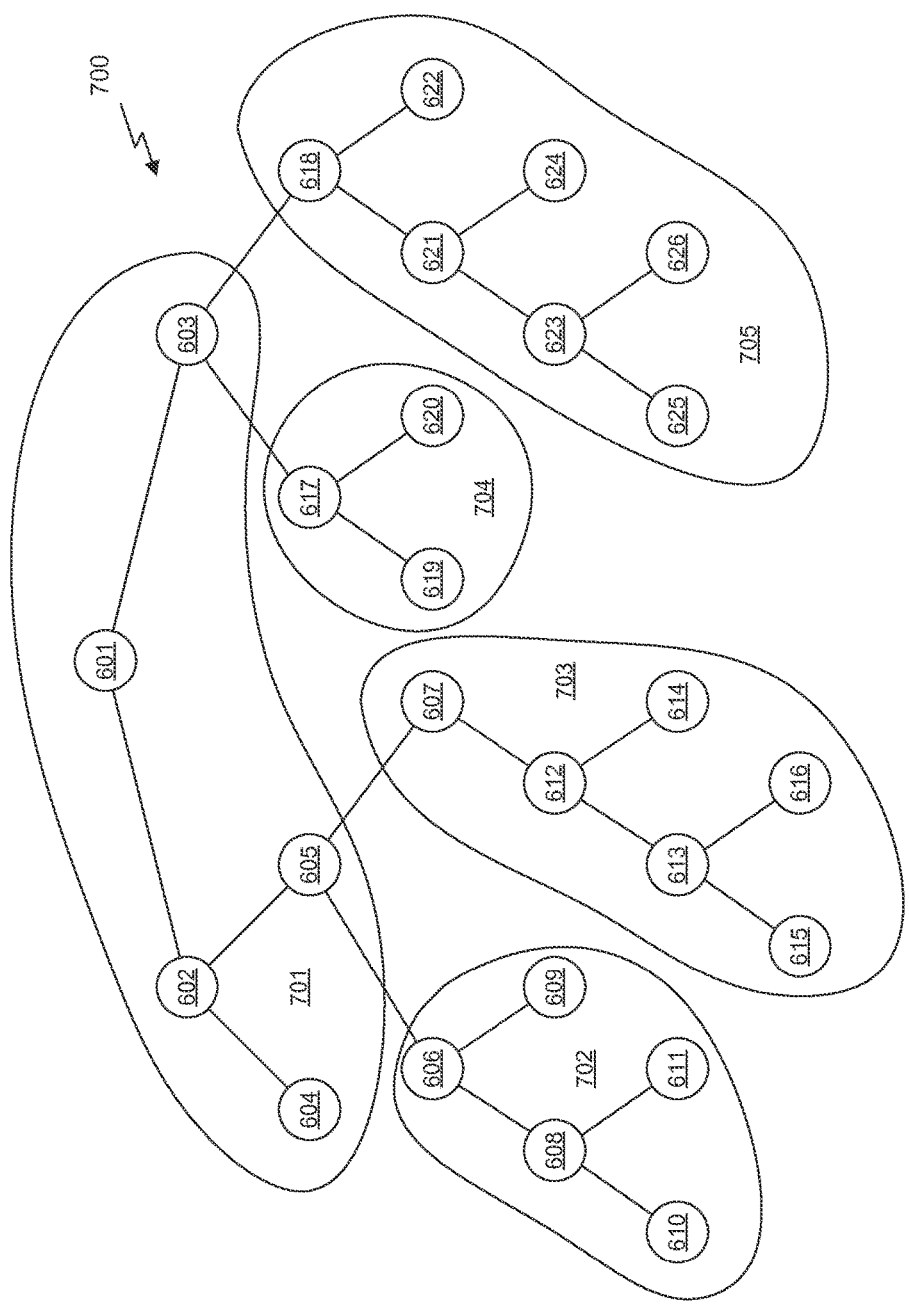
FIG. 7A illustrates a tree data structure, in accordance with one embodiment.

FIG. 7A illustrates a tree data structure 700, in accordance with one embodiment. In one embodiment, the TTU 500 reads at least a portion of the tree data structure 700 from a memory such as memory 204 to perform an operation such as a tree traversal operation. The accuracy of such tree traversal operations may be affected by the precision of values encoded within the tree data structure 700. For example, when intersecting a ray with a particular bounding volume, the precision of the values used to specify the ray and/or the bounding volume, may affect the results of the intersection test. The level of imprecision used during encoding of the tree data structure may be compensated for by always ensuring the imprecise version of the bounding volume data encoded in the tree data structure 700 specifies a bounding volume that fully encloses the precise bounding volume being encoded. In other words, the bounding volume that is encoded should always be larger than the un-encoded bounding volume. However, such techniques may result in false positives during the tree traversal operation that decrease the efficiency of the tree traversal operations performed on the tree data structure 700.

As shown in FIG. 7A, the tree data structure 700 is similar to the tree data structure 600 in that the topology of the nodes within the tree data structure 700 is the same. Spatial values for each of the nodes may be encoded within the tree data structure 700 using a fixed-width encoding format such as the FP32 floating-point format, where each value is specified relative to a global coordinate system. Again, the accuracy of the tree traversal operation depends on the precision of each of the encoded values. Consequently, a more precise acceleration structure can be created from the tree data structure 700 by modifying the tree data structure 700 such that the values encoded therein are encoded relative to two or more local coordinate systems, each local coordinate system tailored to a particular subset of nodes within the tree data structure 700.

The plurality of the nodes (e.g., 600, 601, 602, etc.) in the tree data structure 700 may be grouped into distinct nodesets. Each nodeset may be associated with a different local coordinate system and all values associated with the nodeset may be encoded relative to the corresponding local coordinate system instead of the global coordinate system. As shown in FIG. 7A, the nodes 601, 602, 603, 604, and 605 are grouped into a first nodeset 701; the nodes 606, 608, 609, 610, and 611 are grouped into a second nodeset 702; the nodes 607, 612, 613, 614, 615, and 616 are grouped into a third nodeset 703; the nodes 617, 619, and 620 are grouped into a fourth nodeset 704; and the nodes 618, 621, 622, 623, 624, 625, and 626 are grouped into a fifth nodeset 705. The first nodeset 701 is associated with a first local coordinate system, the second nodeset 702 is associated with a second local coordinate system, the third nodeset 703 is associated with a third local coordinate system, and so forth.

The particular grouping of the nodes into distinct nodesets may be accomplished according to various algorithms. In one embodiment, the selected algorithm should aim to satisfy three criteria: (1) maximize the achieved spatial resolution; (2) minimize the number of coordinate system transformations processed during the traversal; and (3) minimize the number of transformation nodes along paths from the root node to the leaf nodes (i.e., minimize the number of nodesets along any given path). The first criterion may be addressed using a cost function that penalizes nodesets having insufficient precision. The second criterion may be addressed by either minimizing the number of nodesets or by minimizing a probability of processing a transformation node during the traversal. According to a commonly used surface-area cost model, the probability may be approximated by calculating the total surface area over all nodes associated with an incoming edge from another nodeset. The surface area for a node may refer to the surface area of a bounding volume associated with the node. The surface-area cost model is illustrated by Goldsmith et al., "Automatic Creation of Object Hierarchies for Ray Tracing," IEEE Computer Graphics and Applications, vol. 7, 1987, pp. 14-20; and MacDonald et al., "Heuristics for ray tracing using space subdivision," The Visual Computer, vol. 6, 1990, pp. 153-166, each of which is incorporated by reference. The third criterion may be addressed by ensuring any path only includes one transformation node between a top-level nodeset and a lower-level nodeset. In other words, the third criterion may be addressed by only including two hierarchical levels of nodesets such that all lower-level nodesets include a root node that is connected by an edge to a node in the top-level nodeset.

One example of an algorithm for grouping nodes into the distinct nodesets is set forth below and illustrated by FIG. 8B. In one embodiment, a processor may be configured to implement an algorithm that groups nodes from an initial tree data structure into one or more nodesets. Once a particular grouping has been selected, the grouping may be evaluated and accepted or rejected based on a set of criteria. If the grouping is rejected, then a new grouping is selected and the process is repeated. In other embodiments, different algorithms may be implemented for grouping nodes into nodesets, the different algorithms including, but not limited to: (1) classifying nodes into nodesets based on a proximity of the nodes, (2) classifying nodes into nodesets based on a random selection of edges in the tree data structure; and (3) manually classifying nodes into nodesets using an input device such as a mouse and/or keyboard.

Once the nodes of the tree data structure 700 have been classified into nodesets, a local coordinate system may be chosen for each nodeset. The local coordinate system for a particular nodeset may be selected based on the values associated with the nodes in the nodeset. For example, an origin for the local coordinate system of a particular nodeset may be selected by finding a point that represents a geometric center of all bounding volumes associated with the nodes of the nodeset. Such a local coordinate system may be defined as a translation applied to the global coordinate system. In addition to translating the origin of the global coordinate system to a new origin of the local coordinate system, a rotation and/or scaling transformation may be applied to the global coordinate system in order to define the local coordinate system.

Finding the geometric center of all bounding volumes may be accomplished by finding the geometric center of a bounding volume that contains every bounding volume associated with the nodes in the nodeset. A geometric center of the bounding volume will depend on the bounding volume shape. For example, the geometric center of a spherical bounding volume is located at the center of the sphere, or the geometric center of an AABB is located at the center of the rectangular volume enclosed by the AABB. It will be appreciated that the local coordinate system should be selected in order to maximize the precision for all values encoded by the nodes included in the corresponding nodeset. Once the nodes of the tree data structure 700 have been classified into different nodesets and a local coordinate system has been selected for each nodeset, then the values in the tree data structure 700 may be modified to specify each value encoded within the nodes relative to the corresponding local coordinate system rather than relative to the global coordinate system.

Encoded spatial values may refer to any values encoded for a node that represent coordinates relative to the global coordinate system, such as a location of a plane included in an axis-aligned bounding box, a location of the center of a spherical bounding volume, etc. For example, the initial tree data structure may include encoded spatial values that specify a bounding volume for each node in the tree data structure. In one embodiment, the bounding volumes are AABBs that are encoded using six 32-bit floating point values specified relative to a global coordinate system. Each value specifies the location of a plane of the AABB relative to a particular axis of the global coordinate system and at a location relative to an origin of the global coordinate system. Such values may be modified, such as by translating the values and/or scaling the values, relative to the local coordinate system.

In one embodiment, transforming values specified relative to the global coordinate system into new values specified relative to the local coordinate system may be accomplished using a transformation matrix. Points, as defined by a vector of three coordinates based on the global coordinate system, may be transformed by multiplying the vector by the transformation matrix to calculate a new point relative to the local coordinate system. If the transformation is a translation operation only, then new values specified relative to the local coordinate system may be calculated by adding or subtracting a magnitude of the translation along a given axis to the initial value specified relative to the global coordinate system. If the transformation is a rotation operation only, then new values specified relative to the local coordinate system may be calculated using trigonometric functions based on the angle of rotation. If the transformation is a scaling operation only, then new values specified relative to the local coordinate system may be calculated by multiplying each initial value specified relative to the global coordinate system by a scale factor. Since these transformation operations are linear operations, if the transformation is a combination of any of the aforementioned operations, the new values specified relative to the local coordinate system may be calculated by first applying one transformation to find an intermediate value and then applying another transformation to find the new value relative to the local coordinate system.

In practical terms, if a floating-point format is used as the fixed-width encoding technique, then translating the global coordinate system into a local coordinate system is enough to guarantee maximum spatial resolution for all values encoded for nodes in a particular nodeset. In contrast, if a fixed-point format is used as the fixed-width encoding technique, then translating and scaling the global coordinate system into a local coordinate system may be necessary so that the range of representable coordinates is utilized more effectively.

Figure 7B:
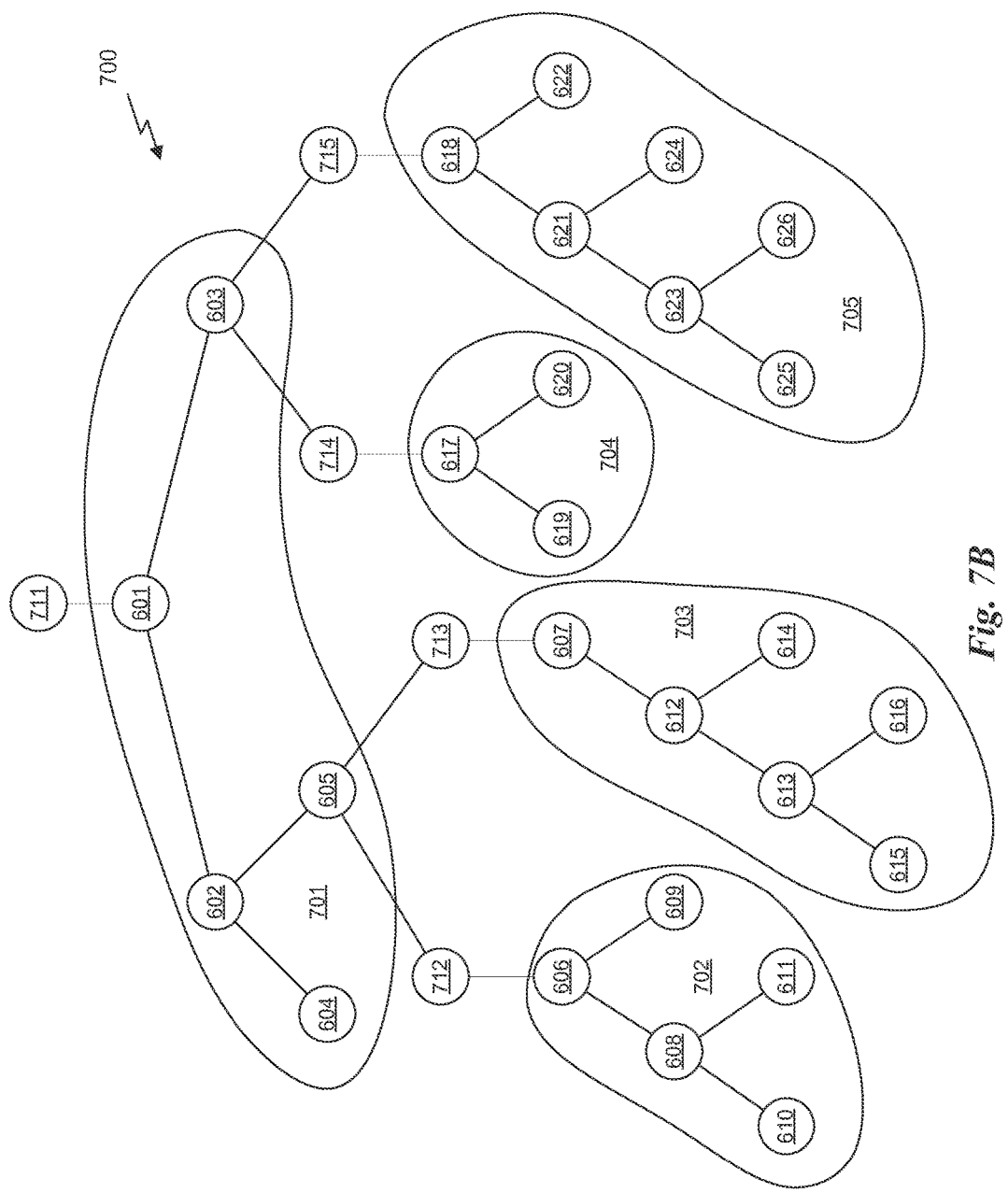
FIG. 7B illustrates a modified tree data structure that includes one or more transformation nodes, in accordance with one embodiment.

FIG. 7B illustrates a modified tree data structure 700 that includes one or more transformation nodes, in accordance with one embodiment. Once all of the values encoded in the tree data structure 700 have been modified to be specified relative to a corresponding local coordinate system, the tree data structure 700 may be further modified to include a plurality of transformation nodes. A transformation node associated with a particular nodeset includes information that enables values specified relative to one coordinate system to be transformed relative to another coordinate system. In one embodiment, a transformation node includes a plurality of values that represent a relative translation, scaling, and/or rotation between two coordinate systems. In one embodiment, the plurality of values may represent a transformation matrix that may be multiplied to vectors of spatial coordinates to transform the coordinates from one local coordinate system into another.

A transformation node may be inserted into the tree data structure 700 at any edge that connects two nodes included in different nodesets. For example, a transformation node 712 is inserted between node 605 and node 606; a transformation node 713 is inserted between node 605 and node 607; a transformation node 714 is inserted between node 603 and node 617; and a transformation node 715 is inserted between node 603 and node 618. The transformation node may be utilized during a tree traversal operation to indicate a switch between different local coordinate systems. Furthermore, in some embodiments, a transformation node 711 may be inserted above the root node of the tree data structure 700. The transformation node 711 inserted above the root node of the tree data structure 700 may be useful in the case of a fixed-point encoding in order to represent the transformation from the global coordinate system into the local coordinate system for the top-level nodeset 701. When using floating-point encoding, the transformation node 711 may be left out of the tree data structure 700 by requiring the local coordinate system for the top-level nodeset 701 to match the global coordinate system.

The modified tree data structure 700 may be utilized during a tree traversal operation to ensure a more accurate traversal that is more efficient when compared against the original tree data structure 600. For example, the TTU 500 may be configured to perform a tree traversal operation utilizing the modified tree data structure 700. A query could be made against the tree data structure based on a query shape that is specified relative to a global coordinate system. The TTU 500 may initialize the stack data structure and push the top node of the modified tree data structure 700 into the traversal stack, as well as load the query data structure into the local storage 502. The scheduler 510 may then initialize the tree traversal operation as normal by fetching node data into the L0 cache 570 and causing the setup unit 520 and traversal units 530 to process one or more nodes of the tree data structure 700.

The tree traversal operation may proceed as described above in the description associated with FIGS. 5A and 5B, with one exception. When the setup unit encounters a transformation node in the traversal of the tree data structure 700, the setup unit may modify one or more values of the query data structure such that the query shape represented by the query data structure is specified relative to a new local coordinate system associated with the nodes that descend from the transformation node in the tree data structure 700. Consequently, all processing that is performed for nodes in a particular nodeset will be performed relative to a corresponding local coordinate system. By simply transforming the query shape from one coordinate system to another, the tree traversal operation may improve the spatial resolution of any calculations performed thereon.

It will be appreciated that the tree traversal operation may follow paths both from the root node to leaf nodes, but also from leaf nodes back up the tree. In such cases, a transformation node may be processed both while descending the tree and while ascending the tree. Thus, it may be necessary to perform an inverse transformation on the query shape in order to move from a lower-level local coordinate system to a higher-level local coordinate system. Because translation, scaling, and rotation are linear transformations, the inverse transformation may simply be performed using the information read from the transformation node (such as by multiplying by an inverse of the transformation matrix) processed while ascending up the tree.

In another embodiment, a stack may be maintained by the setup unit that tracks different versions of the query shape associated with each transformation node encountered during the traversal. For example, each time the setup unit 520 processes a transformation node while descending the tree, the setup unit 520 pushes the current version of the query data structure onto the stack. Then, when the setup unit 520 processes a transformation node while ascending the tree, the setup unit 520 may simply pop the top element of the stack to retrieve the query shape specified relative to the higher-level local coordinate system. It will be appreciated that if the number of hierarchical levels of nodesets in the tree data structure 700 is limited to two levels, then only the query data structure associated with the top-level local coordinate system may need to be stored and no stack is needed. In that case, when a transformation node is processed while ascending up the tree, the query data structure based on a lower-level local coordinate system may be discarded and the query data structure based on the top-level local coordinate system may be restored. If another transformation node is encountered during the subsequent traversal descending the tree, then the new query data structure may be generated based on the information in that transformation node.

Figure 8A:
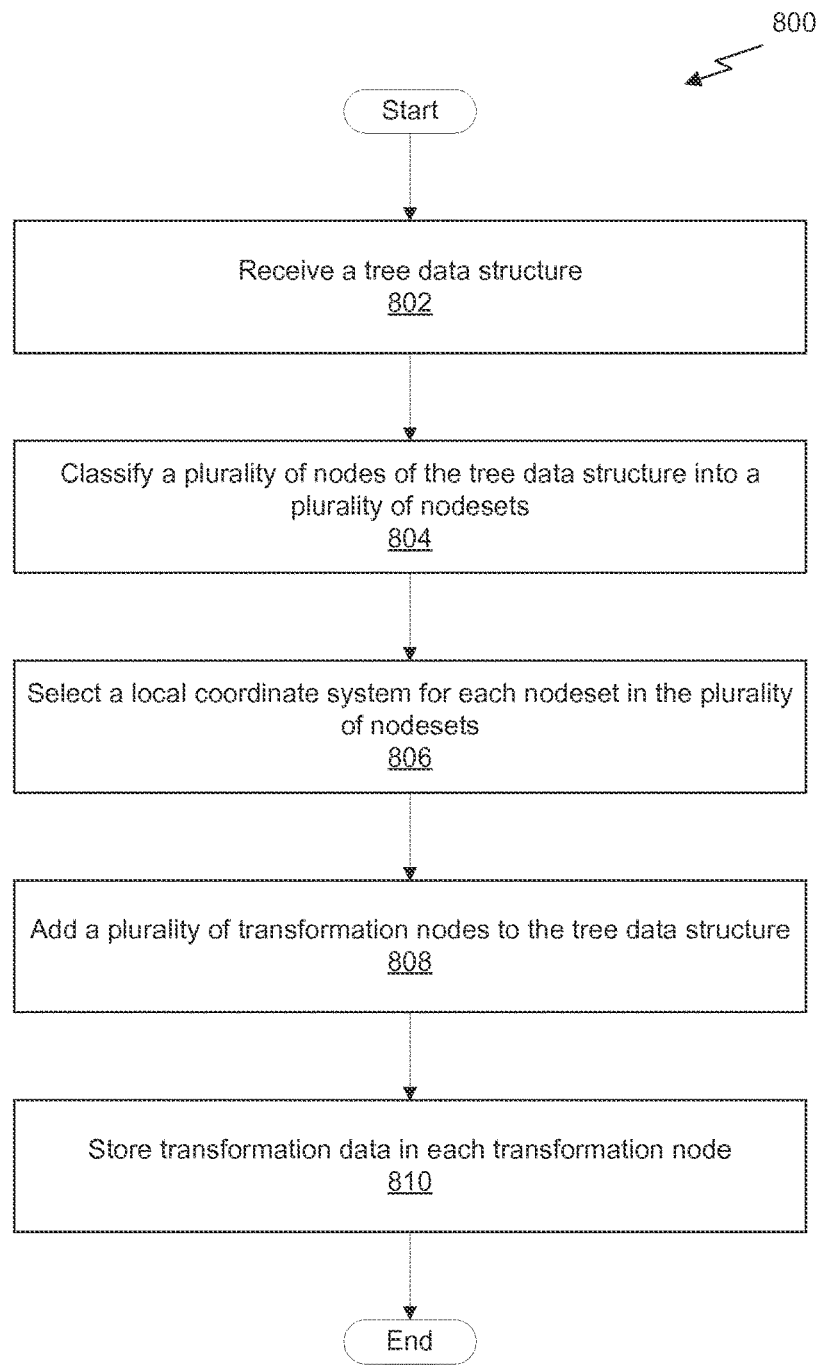
FIG. 8A illustrates a flowchart of a method for modifying a tree data structure, in accordance with one embodiment.

FIG. 8A illustrates a flowchart of a method 800 for modifying a tree data structure, in accordance with one embodiment. The method 800 may be performed by a processor such as a CPU or the PPU 200. At step 802, a tree data structure is received by a processor. The tree data structure may resemble the tree data structure 600. The processor may fetch portions of the tree data structure from a memory. At step 804, the processor classifies a plurality of nodes of the tree data structure into a plurality of nodesets. One technique for classifying the plurality of nodes into the nodesets is set forth below as method 850. In one embodiment, the nodes are classified such that each nodeset meets a set of criteria, which is intended to ensure that spatial data for nodes of each nodeset may be specified relative to a local coordinate system that increases the spatial resolution of the spatial data. After step 804, the nodes have been classified such that the nodes are each assigned to one of a plurality of nodesets.

At step 806, the processor selects a local coordinate system for each nodeset. The local coordinate system may be selected based on the nodes in the nodeset. For example, a local coordinate system based on a transformation of the global coordinate system may be selected by finding a geometric center of all spatial data included in the nodes of a particular nodeset. Once a local coordinate system has been selected for a nodeset, any spatial data included in nodes of the nodeset may be transformed so as to be specified relative to the selected local coordinate system rather than the original global coordinate system.

At step 808, the processor modifies the tree data structure by adding a plurality of transformation nodes to the tree data structure. Transformation nodes may be added at any edge of the tree data structure that connects a node in one nodeset with a node in another nodeset. In one embodiment, a transformation node may also be added as a root node of the tree data structure. The modified tree data structure may be stored in the memory. It will be appreciated that adding the one or more transformation nodes will change the topology of the tree data structure and, consequently, the order and location of data for a particular node in the memory may be changed.

At step 810, the processor may encode transformation data in each transformation node in the tree data structure. In one embodiment, values for a transformation matrix may be encoded within the transformation node, where the transformation matrix represents a linear transformation from a local coordinate system for a nodeset associated with a node above the transformation node in the tree hierarchy to a local coordinate system for a nodeset associated with a node below the transformation node in the tree hierarchy. After step 810, the tree data structure has been modified to include the transformation nodes and all spatial data encoded within the tree data structure has been modified so as to be specified relative to a corresponding local coordinate system.

Figure 8B:
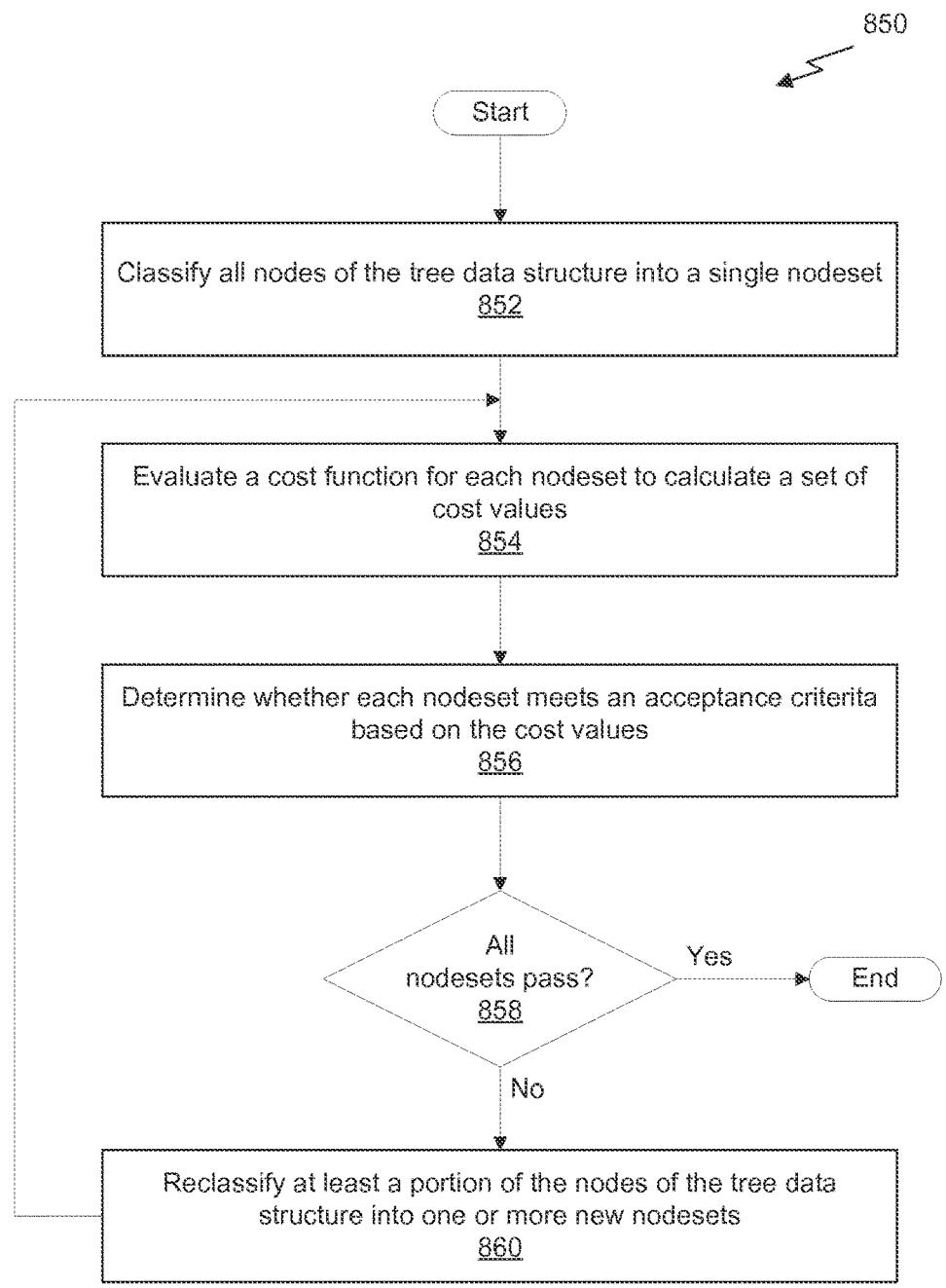
FIG. 8B illustrates a flowchart of a method for classifying the nodes into a plurality of nodesets, in accordance with one embodiment.

FIG. 8B illustrates a flowchart of a method 850 for classifying the nodes into a plurality of nodesets, in accordance with one embodiment. The method 850 may be performed by a processor such as a CPU or the PPU 200. At step 852, the processor classifies all nodes of the tree data structure into a single nodeset. At step 854, the processor evaluates a cost function for each nodeset to calculate a set of cost values. The cost function may be defined in various ways depending on the type of tree data structure and the intended application. In one embodiment, where the tree data structure is a bounding volume hierarchy and each node in the bounding volume hierarchy stores a conservative AABB using fixed-point encoding, the cost function may estimate the expected number of additional ray-primitive intersection tests that need to be performed due to the conservative rounding. One example of a cost function, r, is given below:

$$p = \sum N(l) w^l \quad \text{(Eq. 1)}$$

$$q = \sum N(l) A(l) \quad \text{(Eq. 2)}$$

$$r = \sum N(l) \quad \text{(Eq. 3)}$$

-continued $$\eta = \frac{c}{2^n q}\left(p \cdot s^{root} + \frac{Cr}{2^n}A(\text{root})\right) \quad \text{(Eq. 4)}$$

where the sums are evaluated over leaf nodes of the tree data structure, indicated as 1. C is the average number of units in last position that the size of each AABB is increased due to conservative rounding, n is a number of bits used to encode the size of the AABBs, $s^{root}$ identifies the size of the AABB for the root node as a vector of $<s_x, s_y, s_z>$, $w^l$ is a vector calculated as $<2(s_y^l+s_z^l), 2(s_x^l+s_z^l), 2(s_y^l+s_x^l)>$, A(root) is a surface area of the AABB for the root node, A(l) is a surface area of the AABB for node l, N(l) is a number of triangles in node l, and p·s indicates the dot product between vectors p and s.

At step 856, the processor determines whether each nodeset meets an acceptance criterion based on the cost values. The test of whether a particular nodeset meets the acceptance criterion may be determined by comparing the cost value for the nodeset to a threshold value. At step 858, the processor checks whether all of the proposed nodesets met the acceptance criterion. If all of the proposed nodesets met the acceptance criterion, then the classification of each node into one of the proposed nodesets is accepted and the method 850 terminates. However, if at least one of the nodesets did not meet the acceptance criterion, then, at step 860, the processor reclassifies at least a portion of the nodes into one or more new nodesets. After step 860, the method returns to step 854, where new cost values are evaluated for each of the proposed nodesets.

In one embodiment, the reclassification of the nodes may be performed as follows. For any nodeset that did not meet the acceptance criterion, the root node of that nodeset is reclassified into a top-level nodeset, and then the nodeset is split into multiple nodesets, each of which corresponds to a different subtree corresponding to the child nodes of the root node. The process is then repeated until all of the proposed nodesets meet the acceptance criterion. The result of this algorithm is that a single top-level nodeset accumulates a set of nodes that were removed from proposed nodesets that did not meet the acceptance criterion and a plurality of lower-level nodesets that meet the acceptance criterion. In one embodiment, the top-level nodeset may not be tested against the acceptance criterion and will be accepted as long as each of the lower-level nodesets meets the acceptance criterion. As long as each of the lower-level nodesets meets the acceptance criterion and the total number of nodesets is relatively small, it is very likely that the top-level nodeset will also meet the acceptance criterion in practice. In another embodiment, the method 850 may be executed again for the nodes in the top-level nodeset to ensure that the acceptance criterion is met in all cases.

Figure 9:
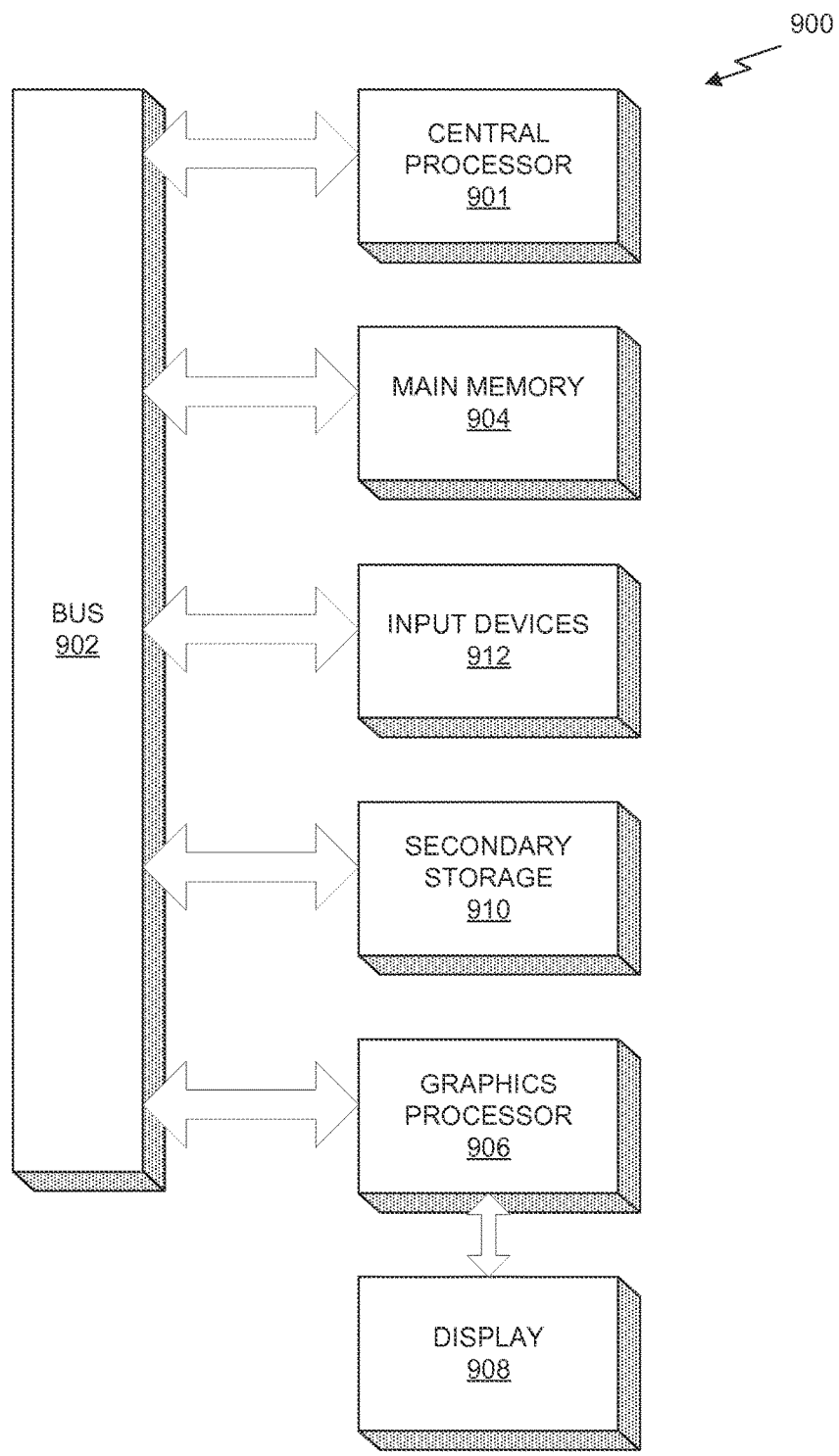
FIG. 9 illustrates an exemplary system in which the various architecture and/or functionality of the various previous embodiments may be implemented.

FIG. 9 illustrates an exemplary system 900 in which the various architecture and/or functionality of the various previous embodiments may be implemented. As shown, a system 900 is provided including at least one central processor 901 that is connected to a communication bus 902. The communication bus 902 may be implemented using any suitable protocol, such as PCI (Peripheral Component Interconnect), PCI-Express. AGP (Accelerated Graphics Port), HyperTransport, or any other bus or point-to-point communication protocol(s). The system 900 also includes a main memory 904. Control logic (software) and data are stored in the main memory 904 which may take the form of random access memory (RAM).

The system 900 also includes input devices 912, a graphics processor 906, and a display 908, i.e. a conventional CRT (cathode ray tube), LCD (liquid crystal display), LED (light emitting diode), plasma display or the like. User input may be received from the input devices 912, e.g., keyboard, mouse, touchpad, microphone, and the like. In one embodiment, the graphics processor 906 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 900 may also include a secondary storage 910. The secondary storage 910 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 904 and/or the secondary storage 910. Such computer programs, when executed, enable the system 900 to perform various functions. The memory 904, the storage 910, and/or any other storage are possible examples of computer-readable media.

In one embodiment, the architecture and/or functionality of the various previous figures may be implemented in the context of the central processor 901, the graphics processor 906, an integrated circuit (not shown) that is capable of at least a portion of the capabilities of both the central processor 901 and the graphics processor 906, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 900 may take the form of a desktop computer, laptop computer, server, workstation, game consoles, embedded system, and/or any other type of logic. Still yet, the system 900 may take the form of various other devices including, but not limited to a personal digital assistant (PDA) device, a mobile phone device, a television, etc.

Further, while not shown, the system 900 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
executing, via a processor, a tree traversal operation for a tree data structure, wherein each node in the tree data structure is classified into one of a plurality of nodesets, the plurality of nodesets corresponding to a plurality of local coordinate systems, wherein spatial values encoded within each node are specified relative to the local coordinate system;
receiving, at the processor, a transformation node during the tree traversal operation, wherein the transformation node includes transformation data;
transforming, by the processor, a query shape represented by a query data structure from a global coordinate system to a first local coordinate system of the plurality of local coordinate systems based on the transformation data, wherein each local coordinate system has a higher level of spatial resolution compared with the global coordinate system; and
generating a color value for a pixel intersected by the query data structure when the transformed query shape intersects a first node in the tree data structure.

2. The method of claim 1, wherein the tree data structure represents a bounding volume hierarchy (BVH).

3. The method of claim 1, further comprising:
receiving the tree data structure at the processor; and
classifying, by the processor, the nodes of the tree data structure into the plurality of nodesets.

4. The method of claim 3, wherein classifying the nodes of the tree data structure into the plurality of nodesets comprises:
creating an initial proposed classification for the nodes by classifying all nodes in the tree data structure into a single nodeset;
evaluating a cost function for each nodeset in the proposed classification to calculate a set of cost values;
determining that at least one nodeset in the proposed classification did not meet the acceptance criterion; and
adjusting the proposed classification of the nodes into one or more new nodesets, evaluating the cost function for each nodeset in the adjusted proposed classification, and determining whether each of the nodesets in the adjusted proposed classification meets the acceptance criterion.

5. The method of claim 4, wherein adjusting the proposed classification of the nodes comprises, for each nodeset that does not meet the acceptance criterion:
classifying the root node of the nodeset into a top-level nodeset; and
splitting the nodeset into multiple lower-level nodesets, where each nodeset in the multiple lower-level nodesets corresponds to a subtree associated with a child node of the root node.

6. The method of claim 4, wherein the cost function estimates the expected number of additional intersection tests that need to be performed due to conservative rounding.

7. The method of claim 1, further comprising selecting the local coordinate system for each nodeset by calculating a geometric center of a set of bounding volumes associated with the nodes in the nodeset, wherein the geometric center is selected as the origin of the local coordinate system.

8. The method of claim 1, wherein the transformation data comprises a scale factor represents a difference in scale between the global coordinate system and the first local coordinate system.

9. A non-transitory computer-readable storage medium storing instructions that, when executed by a processor, cause the processor to perform steps comprising:
executing a tree traversal operation for a tree data structure, wherein each node in the tree data structure is classified according to one of a plurality of nodesets, the plurality of nodesets corresponding to a plurality of local coordinate systems, wherein spatial values encoded within each node are specified relative to the local coordinate system;
receiving a transformation node during the tree traversal operation by the setup unit, wherein the transformation node includes transformation data;
transforming a query shape represented by a query data structure from a global coordinate system to a first local coordinate system of the plurality of local coordinate systems based on the transformation data, wherein each local coordinate system has a higher level of spatial resolution compared with the global coordinate system; and
generating a color value for a pixel intersected by the query data structure when the transformed query shape intersects a first node in the tree data structure.

10. The method of claim 1, further comprising intersecting the transformed query shape with the spatial values encoded within the first node that are specified relative to the first local coordinate system.

11. The non-transitory computer-readable storage medium of claim 9, wherein the transformation data comprises a scale factor represents a difference in scale between the global coordinate system and the first local coordinate system.

12. The non-transitory computer-readable storage medium of claim 9, the steps further comprising:
receiving the tree data structure at the processor; and
classifying, by the processor, the nodes of the tree data structure into the plurality of nodesets.

13. The non-transitory computer-readable storage medium of claim 12, wherein classifying the nodes of the tree data structure into the plurality of nodesets comprises:
creating an initial proposed classification for the nodes by classifying all nodes in the tree data structure into a single nodeset;
evaluating a cost function for each nodeset in the proposed classification to calculate a set of cost values;
determining that at least one nodeset in the proposed classification did not meet the acceptance criterion; and
adjusting the proposed classification of the nodes into one or more new nodesets, evaluating the cost function for each nodeset in the adjusted proposed classification, and determining whether each of the nodesets in the adjusted proposed classification meets the acceptance criterion.

14. The method of claim 13, wherein adjusting the proposed classification of the nodes comprises, for each nodeset that does not meet the acceptance criterion:
classifying the root node of the nodeset into a top-level nodeset; and
splitting the nodeset into multiple lower-level nodesets, where each nodeset in the multiple lower-level nodesets corresponds to a subtree associated with a child node of the root node.

15. The non-transitory computer-readable storage medium of claim 9, further comprising selecting the local coordinate system for each nodeset by calculating a geometric center of a set of bounding volumes associated with the nodes in the nodeset, wherein the geometric center is selected as the origin of the local coordinate system.

16. The non-transitory computer-readable storage medium of claim 9, further comprising intersecting the transformed query shape with the spatial values encoded within the first node that are specified relative to the first local coordinate system.

17. A system, comprising:
a parallel processing unit that includes at least one tree traversal unit configured to:
execute a tree traversal operation for a tree data structure, wherein each node in the tree data structure is classified according to one of a plurality of nodesets, the plurality of nodesets corresponding to a plurality of local coordinate systems, wherein spatial values encoded within each node are specified relative to the local coordinate system,
receive a transformation node during the tree traversal operation, wherein the transformation node includes transformation data,
transform a query shape represented by a query data structure from a global coordinate system to a first local coordinate system of the plurality of local coordinate systems based on the transformation data, wherein each local coordinate system has a higher level of spatial resolution compared with the global coordinate system, and
generate a color value for a pixel intersected by the query data structure when the transformed query shape intersects a first node in the tree data structure.

18. The system of claim 17, wherein the parallel processing unit is further configured to:
receive the tree data structure; and
classify the nodes of the tree data structure into the plurality of nodesets.

19. The system of claim 18, wherein classifying the nodes of the tree data structure into the plurality of nodesets comprises:
creating an initial proposed classification for the nodes by classifying all nodes in the tree data structure into a single nodeset;
evaluating a cost function for each nodeset in the proposed classification to calculate a set of cost values;
determining that at least one nodeset in the proposed classification did not meet the acceptance criterion; and
adjusting the proposed classification of the nodes into one or more new nodesets, evaluating the cost function for each nodeset in the adjusted proposed classification, and determining whether each of the nodesets in the adjusted proposed classification meets the acceptance criterion.

20. The system of claim 17, further comprising intersecting the transformed query shape with the spatial values encoded within the first node that are specified relative to the first local coordinate system.

* * * * *